United States Patent
Lin et al.

(10) Patent No.: US 9,871,721 B2
(45) Date of Patent: Jan. 16, 2018

(54) MULTICASTING A DATA MESSAGE IN A MULTI-SITE NETWORK

(71) Applicant: Hangzhou H3C Technologies Co., Ltd., Hangzhou (CN)

(72) Inventors: Pengcheng Lin, Beijing (CN); Ling Shen, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 116 days.

(21) Appl. No.: 14/768,707

(22) PCT Filed: Feb. 26, 2014

(86) PCT No.: PCT/CN2014/072561
§ 371 (c)(1),
(2) Date: Aug. 18, 2015

(87) PCT Pub. No.: WO2014/131350
PCT Pub. Date: Sep. 4, 2014

(65) Prior Publication Data
US 2016/0006646 A1     Jan. 7, 2016

(30) Foreign Application Priority Data

Feb. 26, 2013   (CN) .......................... 2013 1 0059688

(51) Int. Cl.
*H04L 12/00* (2006.01)
*H04L 12/761* (2013.01)
(Continued)

(52) U.S. Cl.
CPC .............. *H04L 45/16* (2013.01); *H04L 12/18* (2013.01); *H04L 12/4633* (2013.01);
(Continued)

(58) Field of Classification Search
None
See application file for complete search history.

(56) References Cited

U.S. PATENT DOCUMENTS 6,085,238 A * 7/2000 Yuasa ................. H04L 12/4641
370/409
7,808,887 B2   10/2010 Damm et al.
(Continued)

FOREIGN PATENT DOCUMENTS

CN    101442497    5/2009
CN    101621477    1/2010
(Continued)

OTHER PUBLICATIONS

"Enterprise Layer 3 Multicast Implementation Guide", Juniper Networks, Inc., Dec. 22, 2009.
(Continued)

*Primary Examiner* — Marcus R Smith
*Assistant Examiner* — Gautam Sharma
(74) *Attorney, Agent, or Firm* — Hewlett Packard Enterprise Patent Department

(57) ABSTRACT

According to an example, in a method for multicasting a data message by an apparatus in a multi-site network (MSN), a multicast data message that is to be communicated to another apparatus over the MSN network may be received, in which the apparatus includes a MSN-link port through which data messages are to be communicated to the another apparatus. In addition, a determination may be made that the received multicast data message is to be communicated to the another apparatus through the MSN-link port. The received multicast data message may be replicated and the replicated multicast data message may be encapsulated into a MSN message. Moreover; the MSN message encap-
(Continued)

sulating the replicated multicast data message may be tunneled to the another apparatus over the MSN-link port.

12 Claims, 9 Drawing Sheets

(51) Int. Cl.
    *H04L 12/64*     (2006.01)
    *H04L 12/18*     (2006.01)
    *H04L 12/46*     (2006.01)
    *H04L 12/931*     (2013.01)
    *H04L 12/935*     (2013.01)

(52) U.S. Cl.
    CPC ...... *H04L 12/4641* (2013.01); *H04L 12/6418* (2013.01); *H04L 49/201* (2013.01); *H04L 49/3009* (2013.01); *H04L 49/351* (2013.01); *H04L 12/1836* (2013.01)

(56) References Cited

U.S. PATENT DOCUMENTS

| | | | |
|---|---|---|---|
| 8,166,205 B2 | 4/2012 | Farinacci et al. | |
| 2002/0021697 A1* | 2/2002 | Tsuchiya | H04L 12/18 370/392 |
| 2003/0174725 A1* | 9/2003 | Shankar | H04L 12/4645 370/428 |
| 2004/0066781 A1* | 4/2004 | Shankar | H04L 12/4666 370/389 |
| 2005/0169270 A1 | 8/2005 | Mutou et al. | |
| 2007/0091890 A1 | 4/2007 | Radhakrishnan et al. | |
| 2007/0127459 A1* | 6/2007 | Lo | H04L 12/4666 370/389 |
| 2008/0095160 A1* | 4/2008 | Yadav | H04L 12/1886 370/390 |
| 2008/0291914 A1* | 11/2008 | Bi | H04L 12/1836 370/390 |
| 2009/0109848 A1* | 4/2009 | Hato | H04L 12/4641 370/235 |
| 2011/0134925 A1 | 6/2011 | Safrai et al. | |
| 2012/0170578 A1 | 7/2012 | Anumala et al. | |
| 2013/0021942 A1 | 1/2013 | Bacthu et al. | |
| 2013/0089093 A1* | 4/2013 | Bacthu | H04L 12/4633 370/390 |
| 2015/0156108 A1* | 6/2015 | Shi | H04L 12/4658 370/218 |

FOREIGN PATENT DOCUMENTS

| | | |
|---|---|---|
| CN | 102291307 | 12/2011 |
| CN | 102413061 | 4/2012 |
| CN | 102611634 | 7/2012 |

OTHER PUBLICATIONS

International Search Report and Written Opinion dated Jun. 5, 2014 issued on PCT Patent Application No. PCT/CN2014/072561 dated Feb. 26, 2014, State Intellectual Property Office, P.R. China.
Extended European Search Report, EP Application No. 14757337.2, Date of Completion: Jul. 7, 2016, dated Jul. 15, 2016, pp. 1-11.
H. Grover et al., "Overlay Transport Virtualization," Feb. 23, 2013, pp. 1-28, Network Working Group, Standards Track, IETF Trust.

* cited by examiner

500

RECEIVE CONFIGURATION INFORMATION FOR A DESIGNATED ROUTER PORT
502

↓

INPUT THE CORRESPONDING RELATION BETWEEN THE VLAN AND THE DESIGNATED ROUTER PORT INTO THE MULTICAST SNOOPING TABLE ACCORDING TO THE RECEIVED CONFIGURATION INFORMATION
504

ENABLE A MULTICAST QUERY FUNCTION TO CREATE A DESIGNATED ROUTER PORT FOR EACH OF THE LOCAL VLANS
602

↓

INPUT THE CORRESPONDING RELATION BETWEEN THE VLAN AND THE DESIGNATED ROUTER PORT INTO THE MULTICAST SNOOPING TABLE
604

*FIG. 6*

MULTICASTING A DATA MESSAGE IN A MULTI-SITE NETWORK

CLAIM FOR PRIORITY

The present application is a national stage filing under 35 U.S.C 371 of PCT application number PCT/CN2014/072561, having an international filing date of Feb. 26, 2014, which claims the benefit of priority from Chinese Patent Application, No. 201310059688.6, having a filing date of Feb. 26, 2013, the disclosures of which are hereby incorporated by reference in their entireties.

BACKGROUND

Techniques that are based on an Internet protocol (IP) core network to implement a Layer 2 virtual private network (VPN) in a site, such as a data center, have been gaining popularity. Generally speaking, these types of techniques implement a core network, a site network, and an overlay network. In addition, the routing and forwarding information are maintained on the edge devices of sites without requiring that the core network and the site network be changed. The site network is a Layer 2 network with independent service functionality and is connected to the core network through one or more edge devices and is typically managed and controlled by a single organization. The site network mainly includes a host and a switching device, and an edge device provides Layer 2 switching functionality between sites. The overlay network is a virtual network created between the edge devices of a site, which provides a Layer 2 interconnection between site networks. The edge devices inform one another of the media access control (MAC) addresses of all of the hosts and routers that are connected to the respective edge devices, and form a larger Layer 2 forwarding domain by interconnecting a plurality of site networks. The core network is a network that is mainly carried by an IP routing device and that provides interconnection between site networks.

BRIEF DESCRIPTION OF THE DRAWINGS

Features of the present disclosure are illustrated by way of example and not limited in the following figure(s), in which like numerals indicate like elements, in which:

FIGS. 5-8, respectively, are flow diagrams of methods for identifying the designated router port, according to examples of the present disclosure;

DETAILED DESCRIPTION

Figure 1:
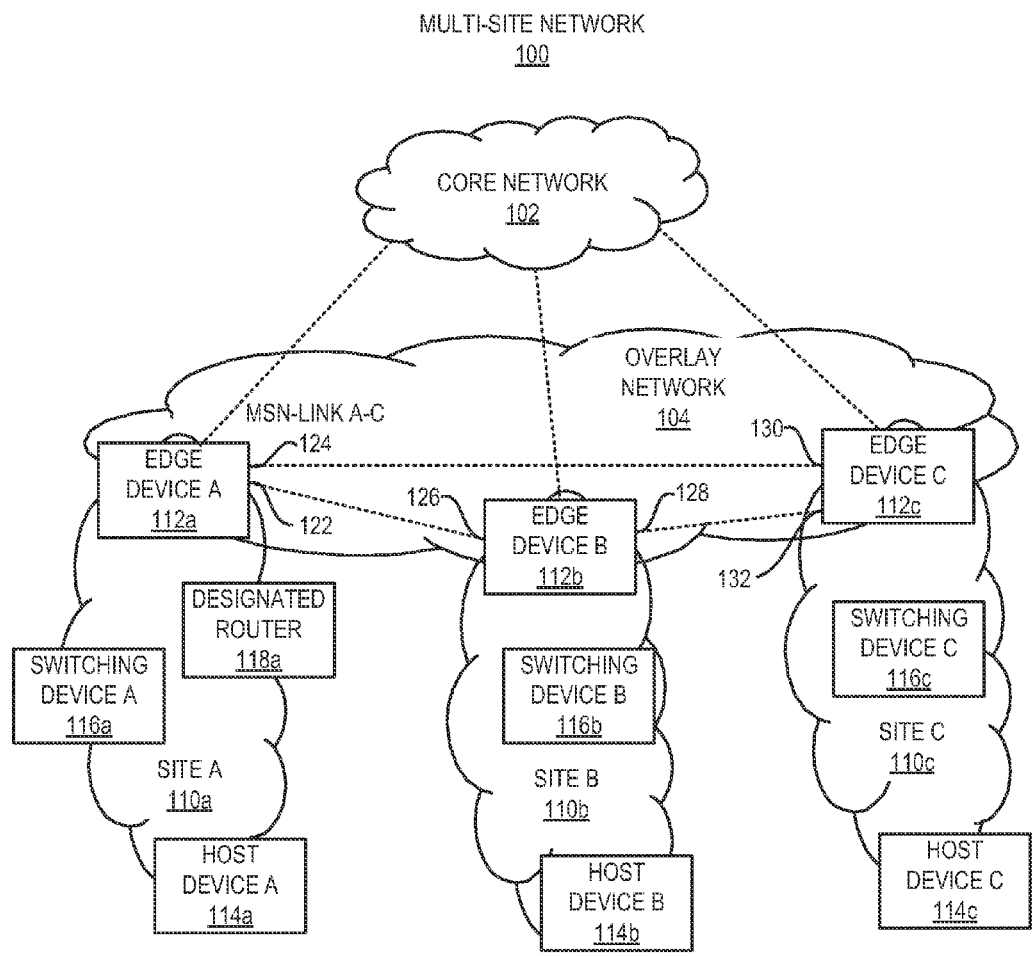
FIG. 1 is a simplified diagram of a multi-site network, in which various aspects of the methods and apparatuses disclosed herein may be implemented, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are methods for multicasting a data message over a multi-site network (MSN) and apparatuses, e.g., edge devices, for implementing the methods. Particularly, for instance, the methods disclosed herein may be implemented to communicate a multicast data message from a source device connected to a first edge device located in a first network site to a receiver device connected to a second edge device located in a second network site over a MSN. A MSN may include a plurality of geographically dispersed network sites, e.g., local area networks (LANs), that are interconnected by a wide area network (WAN), such that the plurality of geographically dispersed network sites together act similarly to a single LAN.

According to an example, the first edge device and the second edge device may implement an Ethernet virtualization interconnection (EVI) over the MSN. In another example, the first edge device and the second edge device may implement an Overlay Transport Virtualization (OTV) technique. In these examples, the MSN may be construed as employing one of EVI and OTV. EVI, for instance, may be used to implement a Layer 2 virtual private network (L2VPN) technique based on an Internet Protocol (IP) core network. A VPN instance may be established among different edge devices. According to an example, an overlay network may be used to facilitate VLAN expansion across geographically dispersed sites. The overlay network generally includes an overlay interface and virtual links to carry Layer 2 traffic between sites. For example, the virtual links may be any communication channels over a Layer 3 core network. In one example, a physical communication medium may be virtualized to include multiple communication channels such that traffic of one communication channel is separated from that of a different communication channel (e.g., using a suitable identifier). The virtual link may be a Layer 2 virtual link (e.g., virtual Ethernet link) tunneled through the Layer 3 network using any suitable protocol (e.g., EVI and Generic Routing Encapsulation (GRE), etc.). Layer 2 traffic between sites may be encapsulated with an IP header ("MAC in IP") to reach its destination via the core network. Traffic may be forwarded in the core network based on the IP header.

In the methods disclosed herein, a multicast data message that is to be communicated to another apparatus over the MSN may be received by an apparatus. The apparatus may be an edge device and may include a MSN-link port through which data messages are to be communicated to another apparatus, e.g., another edge device, over the MSN. A determination may be made that the received multicast data message is to be communicated to the another apparatus through the MSN-link port. In addition, the received multicast data message may be replicated and the replicated multicast data message may be encapsulated into a MSN message. Moreover, the MSN message encapsulating the replicated multicast data message may be sent to the another apparatus over the MSN-link port.

In the methods, a first edge device may enable a multicast snooping protocol and a designated router port may be created for each VLAN on the first edge device. The multicast snooping protocol may be any of an Internet group management protocol (IGMP) snooping protocol, a multicast listener discovery (MLD) snooping protocol, a protocol independent multicast (PIM) snooping protocol, etc. In addition, a designated router port in the apparatus corresponding to a virtual local area network (VLAN) may be identified and a corresponding relation between the VLAN and the designated router port may be inputted into a local multicast snooping table. The designated router port may be one of an Ethernet port connected to a multicast query device, an Ethernet port connected to a designated router, and a virtual port that is not a MSN-link port.

The received multicast data message may include group information of a multicast group to which the multicast data message belongs as well as VLAN information. Moreover, the determination that the received multicast data message is to be communicated to the another apparatus through the MSN-link port may be made through an identification of a table entry in the local multicast snooping table that matches the VLAN information included in the received multicast data message, in which the table entry includes a multicast router port and a multicast member port corresponding to the group information. Furthermore, the received multicast data message may be replicated according to the multicast router port and the multicast member port corresponding to the group information. The methods may further include determining whether the matching table entry includes the designated router port. Furthermore, the replicated multicast data message may be encapsulated into a MSN message in response to the matching table entry including the designated router port and the multicast member port including the MSN-link port.

According to an example, through implementation of the methods and apparatuses disclosed herein, an edge device may multicast a data message in a MSN network, in which a source device is connected to a different edge device than a receiver device. Particularly, the methods and apparatuses disclosed herein may enable multicasting of such a data message while avoiding the horizontal partitioning function. Generally speaking, conventional edge devices have the horizontal partitioning function as a default function to avoid the forming of loops among multiple edge devices of an overlay network. The horizontal partitioning function generally refers to a function that a message received and decapsulated from MSN tunnels will only be forwarded in the local site in which the message is received. As such, the horizontal partitioning function may prevent the message from being forwarded to the core network, that is, the message will be prevented from being forwarded through the MSN tunnels. Thus, in the case where the multicast source and the requester (or receiver) are located in the same Layer 2 network and are connected to different edge devices, the horizontal partitioning function of the edge device may prevent the requester from being able to receive the multicast data message sent by the multicast source.

With reference first to FIG. 1, there is shown a simplified diagram of a MSN 100, in which various aspects of the methods and apparatuses disclosed herein may be implemented, according to an example. It should be understood that the MSN 100 depicted in FIG. 1 may include additional elements and that some of the elements depicted therein may be removed and/or modified without departing from a scope of the MSN 100. For instance, the MSN 100 may include any number of sites. According to an example, the MSN 100 may be an EVI network, an OTV network, etc.

The MSN 100 is depicted as including a core network 102, an overlay network 104, and a plurality of sites (or site networks) 110*a*-110*c* that are connected to each other through the overlay network 104. The MSN 100 may be based on an existing server provider network or enterprise network and provides the sites 110*a*-110*c* with Layer 2 interconnection functionality. The MSN 100 may be construed as an advanced media access control (MAC) in IP technology, which may be used to realize a Layer 2 virtual private network technology based on an IP core network 102. The sites 110*a*-110*n* may be respective data centers or other groups of computing equipment and are to communicate data among each other over the core network 102, which may be implemented over the Internet and/or another type of network. Thus, for instance, the sites 110*a*-110*n* may be data centers that are remotely located from each other, for instance, in different buildings, different cities, different states, different countries, etc. Site A 110*a* is depicted as including an edge device 112*a*.

The core network 102 may be a network that mainly includes an IP routing device for providing Layer 3 interconnection between the site networks 110*a*-110*c*. For instance, the core network 102 may forward IPs of tunnel messages. As shown in FIG. 1, each of the site networks 110*a*-110*c* may be connected to the core network 102 through a respective edge device 112*a*-112*c*. The site networks 110*a*-110*c* may be connected to the core network 102 through multiple respective edge devices 112*a*-112*c*. The site networks 110*a*-110*c* may also include respective host devices 114*a*-114*c*, switching devices 116*a*-116*c*, and a designated router 118*a* (only site A 110*a* is depicted as including a designated router, but it should be understood that the other sites 110*b*, 110*c* may include respective designated routers). The edge devices 112*a*-112*c* may be located at the edges of the site networks 110*a*-110*c* to enable data communications over a MSN, e.g., provide EVI and/or OTV functions. In addition, the edge devices 112*a*-112*c* may operate as Layer 2 switching devices at the site network 110*a*-110*c* side and as a Layer 3 device at the core network 102 side. The edge devices 112*a*-112*c* may also perform message mapping and forwarding from a respective site network 110*a*-110*c* to a MSN tunnel and from a MSN tunnel to a site network 110*a*-110*c*. By way of particular example, a full connection may be established among the edge devices 112*a*-112*c* of the same EVI instance and the EVI MAC may be flooded in all of the edge devices 112*a*-112*c* in the same EVI instance.

The overlay network 104 may be a virtual network established between the edge devices 112*a*-112*c* of the site networks 110*a*-110*c*. The overlay network 104 may provide a Layer 2 interconnection between the site networks 110*a*-110*c*, may realize extensions of virtual local area networks (VLANs) among different site networks 110*a*-110*c*, may carry Layer 2 data flows of extended VLANs among site networks 110*a*-110*c* on a data plane, may announce among the sites 110*a*-110*c*, the MAC address reachability information of all of the host devices 114*a*-114*c* and switching devices 116*a*-116*c* connected to the edge devices 112*a*-112*c* through an interior gateway protocol (IGP) on a control plane, and may interconnect a plurality of site networks 110*a*-110*c* to form a larger Layer 2 forwarding domain. In the MSN 100, transparent transmission of data among the edge devices 112*a*-112*c* may be achieved through a bi-directional virtual Ethernet channel, e.g., a MSN-link. The MSN-links 122-132, e.g., EVI-links, OTV-links, etc., may be carried on MSN tunnels, e.g., EVI tunnels, OTV tunnels, etc., among the edge devices 112*a*-112*c* and each MSN tunnel may carry multiple MSN links.

In the MSN 100, a host device 114*a* may exchange multicast data flows with another host device 114*c* over the overlay network 104. As discussed above, in order to avoid forming loops among the edge devices 112*a*-112*c*, the edge devices 112*a*-112*c* may have a default function of horizontal partitioning. The horizontal partitioning function generally causes the edge devices 112*a*-112*c* to only forward messages that are received and decapsulated from MSN tunnels in the site network 110*a*-110*c* to which the edge device 112*a*-112*c* belongs. As such, an edge device 112*a* may not forward messages that are received and decapsulated from MSN tunnels to the core network 102, i.e., the edge device 112*a* may not forward these messages through the MSN tunnels. Thus, a multicast message requestor (or receiver), e.g., host device 114*c*, that is located in a different site network 110*c* from a multicast message source, e.g., host device 114*a*, may be unable to receive the multicast data message sent by the multicast message source.

As discussed in greater detail herein below, and according to an example, the edge devices 112*a*-112*c* may implement techniques that enable the edge devices 112*a*-112*c* to forward multicast data messages over the overlay network 104 to host devices 114*a*-114*c* that are not within the respective site networks 110*a*-110*c* of the edge devices 112*a*-112*c*. For instance, the edge devices 112*a*-112*c* may, when certain conditions are met, encapsulate a replicated version of a received multicast data message into a MSN message and may forward the MSN message to another one of the edge devices 112*a*-112*c* over the overlay network 104. Particularly, for instance, the MSN message may be a message that is suitably formatted for communication over the MSN. By way of example, the MSN message may be an EVI message or an OTV message. Various examples of the techniques are discussed in greater detail herein below.

Figure 2:
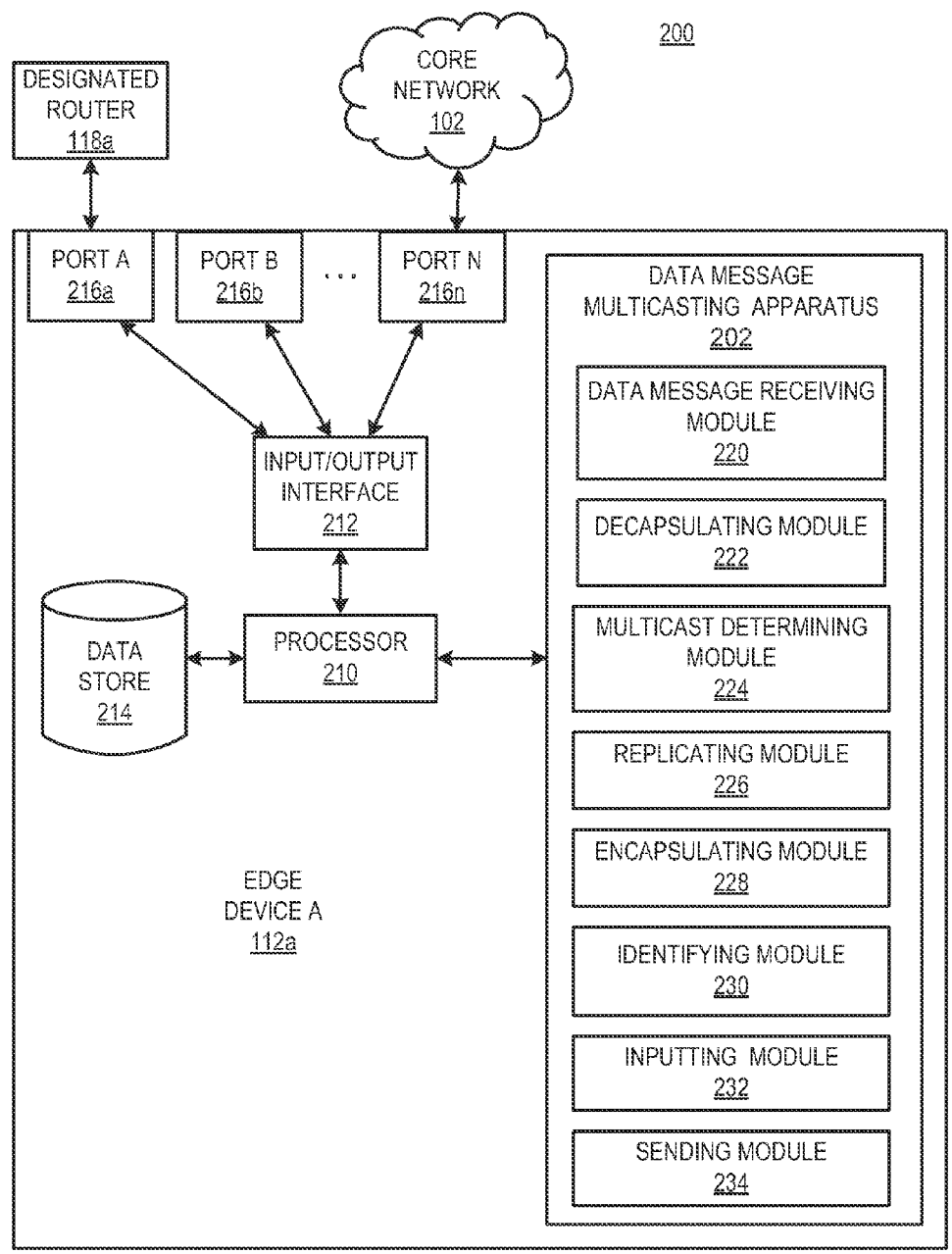
FIG. 2 is a simplified block diagram of an edge device depicted in FIG. 1, according to an example of the present disclosure.

Turning now to FIG. 2, there is shown a simplified block diagram 200 of the edge device 112*a* depicted in FIG. 1, according to an example. It should be understood that the edge device 112*a* depicted in FIG. 2 may include additional elements and that some of the elements depicted therein may be removed and/or modified without departing from a scope of the edge device 112*a*. It should also be understood that some or all of the other edge devices 112*b*-112*n* may have configurations similar to the edge device 112*a*.

As shown in FIG. 2, the edge device 112*a* may contain a data message multicasting apparatus 202, a processor 210, an input/output interface 212, a data store 214, and ports 216*a*-216*n* (the variable "n" may represent an integer greater than 1). The data message multicasting apparatus 202 is also depicted as including a data message receiving module 220, a decapsulating module 222, a multicast determining module (or searching module) 224, a replicating module 226, an encapsulating module 228, an identifying module (or creating module) 230, an inputting module (or configuring module) 232, and a sending module 234.

The processor 210, which may be a microprocessor, a micro-controller, an application specific integrated circuit (ASIC), or the like, is to perform various processing functions in the edge device 112*a*. The processing functions may include invoking or implementing the data message multicasting apparatus 202 and particularly, the modules 220-234 of the data message multicasting apparatus 202, as discussed in greater detail herein below. According to an example, the data message multicasting apparatus 202 is a hardware device on which is stored various sets of machine readable instructions. The data message multicasting apparatus 202 may be, for instance, a volatile or non-volatile memory, such as dynamic random access memory (DRAM), electrically erasable programmable read-only memory (EEPROM), magnetoresistive random access memory (MRAM), memristor, flash memory, floppy disk, a compact disc read only memory (CD-ROM), a digital video disc read only memory (DVD-ROM), or other optical or magnetic media, and the like, on which software may be stored. In this example, the modules 220-234 may be software modules, e.g., sets of machine readable instructions, stored in the data message multicasting apparatus 202.

In another example, the data message multicasting apparatus 202 may be a hardware component, such as a chip, and the modules 220-234 may be hardware modules on the hardware component. In a further example, the modules 220-234 may include a combination of software and hardware modules.

The processor 210 may store data in the data store 214 and may use the data in implementing the modules 220-234. For instance, the processor 210 may store a local multicast snooping table in the data store 214. In addition, the processor 210 may search the table entries of the local multicast snooping table for various information as discussed in greater detail below. Moreover, the processor 210 may input various information into the table entries of the local multicast snooping table, as also discussed in greater detail below. The data store 214 may be volatile and/or non-volatile memory, such as DRAM, EEPROM, MRAM, phase change RAM (PCRAM), memristor, flash memory, and the like. In addition, or alternatively, the data store 214 may be a device that may read from and write to a removable media, such as, a floppy disk, a CD-ROM, a DVD-ROM, or other optical or magnetic media.

The input/output interface 212 may include hardware and/or software to enable the processor 210 to communicate with the host device 114*a*, the switching device 116*a*, and the designated router 118*a* in the site network 110*a* through a port 216*a*-216*n*. The input/output interface 212 may also include hardware and/or software to enable the processor 210 to communicate with other edge devices 112*b*, 112*c* in the other sites 110*b*, 110*c* over the core network 102 through a port 216*a*-216*n*. The input/output interface 212 may include a network interface card and may also include hardware and/or software to enable the processor 210 to communicate with various input and/or output devices (not shown), such as a keyboard, a mouse, a display, etc., through which a user may input instructions into the edge device 112*a* and may view outputs from the edge device 112*a*.

The ports 216*a*-216*n* may be Ethernet ports and may be connected to any of the host device 114*a*, the switching device 116*a*, and the designated router 118*a* shown in FIG. 1. The ports 216*a*-216*n* may alternatively or additionally be connected to the MSN-links 122, 124 as also shown in FIG. 1.

Figure 3:
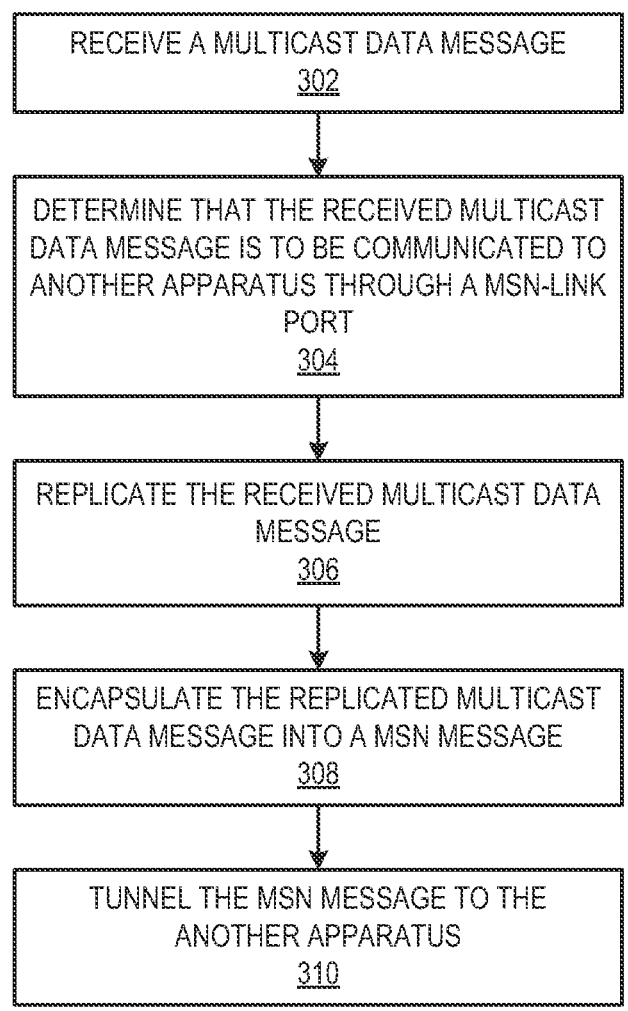
FIGS. 3 and 4, respectively, are flow diagrams of methods for multicasting a data message by an apparatus, e.g., an edge device, according to two examples of the present disclosure.
Figure 4:
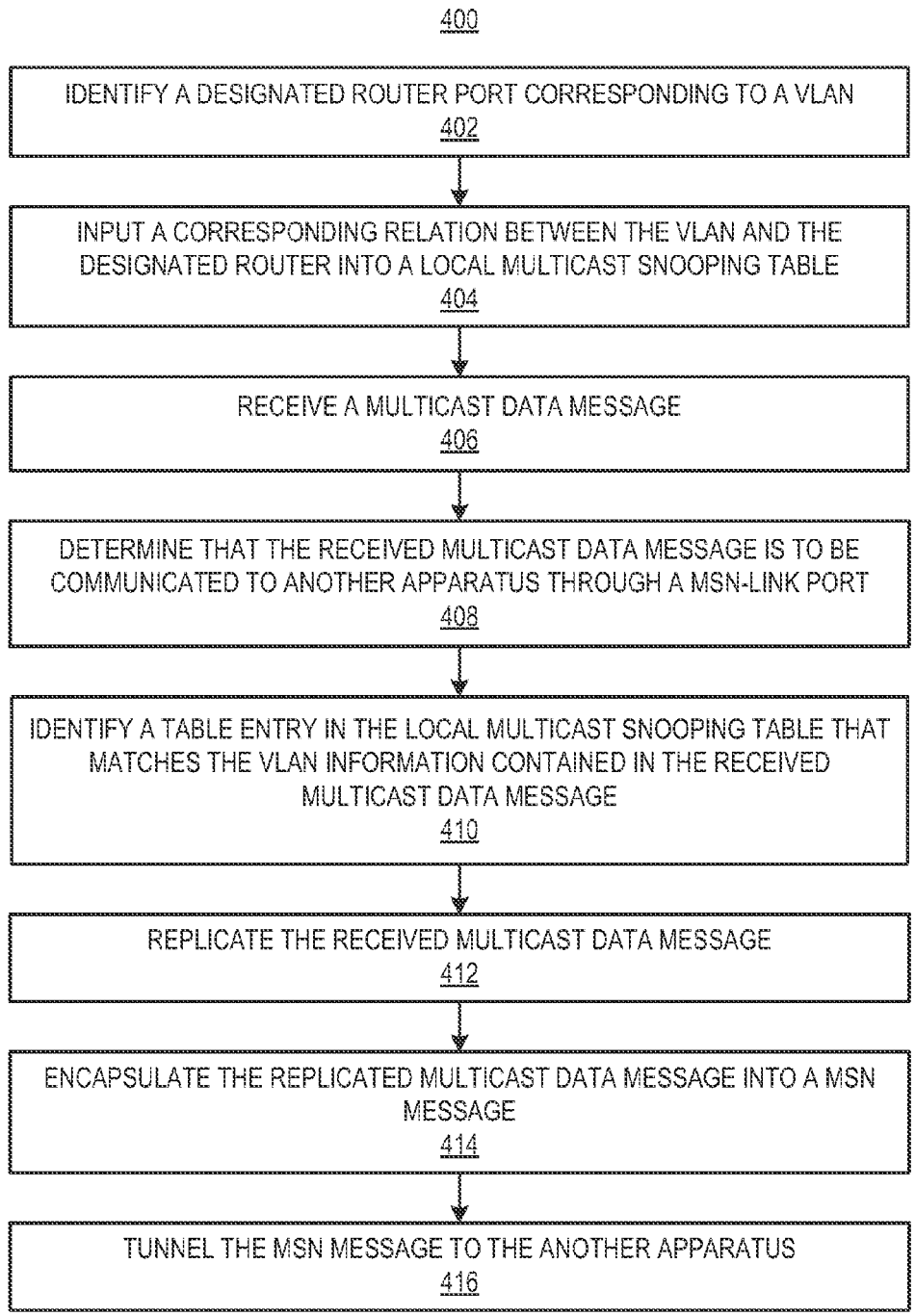

Various manners in which the processor 210 in general, and the modules 220-234 in particular, may be implemented are discussed in greater detail with respect to the methods 300 and 400 respectively depicted in FIGS. 3 and 4. Particularly, FIGS. 3 and 4, respectively, depict flow diagrams of methods 300 and 400 for multicasting a data message by an apparatus, such as an edge device 112a, according to two examples. It should be apparent to those of ordinary skill in the art that the methods 300 and 400 represent generalized illustrations and that other operations may be added or existing operations may be removed, modified, or rearranged without departing from the scopes of the methods 300 and 400. Generally speaking, the processor 210 depicted in FIG. 2 may implement each of methods 300 and 400 through implementation of at least some of the modules 220-234.

With reference first to FIG. 3, at block 302, a multicast data message that is to be communicated to another apparatus, e.g., edge device 112c, over a MSN, e.g., an EVI network, an OTV network, etc., may be received in the apparatus, e.g., edge device 112a. As discussed above, the edge device 112a may include a port 216n to which a MSN-link 124 to another edge device 112c is connected. For instance, the processor 210 may implement the data message receiving module 220 to receive the multicast data message through one of the ports 216a-216n. In one example, the multicast data message may be received from the host device 114a within the site network 110a. In another example, the multicast data message may be received from a remote host device 114c in a remote site network 110c through the core network 102. In any regard, the multicast data message may include group information, for instance, VLAN information, to which the multicast data message belongs.

According to an example, the received multicast data message may be a MSN message having the multicast data message encapsulated in the MSN message. In this example, the processor 210 may implement the decapsulating module 222 to decapsulate the MSN message to obtain the multicast data message.

At block 304, a determination may be made that the received multicast data message is to be communicated to the another apparatus, e.g., edge device 112c, through the MSN-link port. For instance, the processor 210 may implement the multicast determining module 224 to determine whether the multicast data message is to be communicated to another apparatus, e.g., a remote edge device 112b, 112c, through a port 216n that is a MSN-link port. This determination may be made based upon destination information contained in the multicast data message. That is, the processor 210 may determine that the multicast data message is to be communicated to another apparatus through a MSN-link port if a destination address (or addresses) of the multicast data message is located in a site network 110c to which the edge device 112a is connected through a MSN. However, the processor 210 may determine that the multicast data message is not to be communicated to another apparatus through a MSN-link port if the destination addresses of the multicast data message are for host devices in the site network 110a to which the edge device 112a is located.

At block 306, the received multicast data message may be replicated. For instance, the processor 210 may implement the replicating module 226 to replicate the received multicast data message.

At block 308, the replicated multicast data message may be encapsulated into a MSN message. For instance, the processor 210 may implement the encapsulating module 230 to encapsulate the replicated multicast data message in a MSN message.

At block 310, the MSN message encapsulating the replicated multicast data message may be sent, e.g., tunneled, to the another apparatus over the MSN-link port. For instance, the processor 210 may implement the sending module 234 to tunnel the MSN message encapsulating the replicated multicast data message through the MSN-link port.

Turning now to FIG. 4, at block 402, a designated router port in the apparatus corresponding to a virtual local area network (VLAN) may be identified. For instance, the processor 210 may implement the identifying module 230 to make this identification. According to an example, the processor 210 may implement the identifying module 230 to designate a router port for each of a plurality of VLANs. In addition, to prevent the multicast data message in the MSN from being improperly replicated, a VLAN may be caused to have a corresponding designated router port only on one edge device 112a. Various examples in which the identification of the designated router port may be made are described in greater detail herein below.

The designated router port corresponding to the VLAN may be any of an Ethernet port connected to a multicast query device, an Ethernet port connected to a designated router 118a, and a virtual port. The virtual port may be, for instance, a null interface, but not the MSN-link port. The multicast query device may be a device having a multicast query function enabled, for instance, an IGMP inquirer or a MLD protocol inquirer. The designated router 118a may be a router interface that is elected among a plurality of routers in a site network 110a. For instance, the designated router may be a designated router under the PIM protocol.

At block 404, a corresponding relation between the VLAN and the designated router port may be inputted into a local multicast snooping table. For instance, the processor 210 may implement the inputting module 232 to input the corresponding relation between the VLAN and the designated router port as a table entry into a local multicast snooping table stored in the data store 214. According to an example, the local multicast snooping table may be an IGMP snooping table.

At block 406, a multicast data message that is to be communicated to another apparatus, e.g., edge device 112c, over a MSN may be received in the apparatus, e.g., edge device 112a. Block 406 may be similar to block 302 discussed above with respect to FIG. 3 and thus a more detailed discussion of block 406 is omitted. As also discussed above, the multicast data message may be a MSN message having the multicast data message encapsulated in the MSN message. In this example, the processor 210 may implement the decapsulating module 222 to decapsulate the MSN message to obtain the multicast data message.

At block 408, a determination may be made that the received multicast data message is to be communicated to the another apparatus, e.g., edge device 112c, through the MSN-link port. Block 408 may be similar to block 304 discussed above with respect to FIG. 3 and thus a more detailed discussion of block 408 is omitted.

At block 410, a table entry in the local multicast snooping table that matches the VLAN information included in the received multicast data message may be identified. The table entry in the local multicast snooping table may include a multicast router port and a multicast member port corresponding to the group information (e.g., the VLAN information) contained in the multicast data message. According to an example, the processor 210 may implement the multicast determining module 224 to search for table entries in the local multicast snooping table that match the VLAN information contained in the multicast data message.

At block 412, the received multicast data message may be replicated. For instance, the processor 210 may implement the replicating module 226 to replicate the received multicast data message according to the multicast router port and the multicast member port corresponding to the group information. That is, the received multicast data message may be replicated to be delivered out of the multicast router port and the multicast member port corresponding to the group information as indicated in the identified table entries of the local multicast snooping table.

At block 414, the replicated multicast data message may be encapsulated into a MSN message. For instance, the processor 210 may implement the encapsulating module 230 to encapsulate the replicated multicast data message in a MSN message to be forwarded according to each MSN-link port in the multicast member port. According to an example, block 414 may be implemented when certain conditions are met and may be omitted when those conditions are not met. Those conditions may include the matching table entry including the designated router port and the multicast member port including the MSN-link port.

At block 416, the MSN message encapsulating the replicated multicast data message may be sent, e.g., tunneled, to the another apparatus over the MSN-link port. For instance, the processor 210 may implement the sending module 234 to send the MSN message encapsulating the replicated multicast data message through the MSN-link port.

Turning now to FIGS. 5-8, there are shown respective flow diagrams of methods 500-800 for identifying the designated router port, according to a number of examples. The methods 500-800 may respectively be implemented to identify a designated router port and to input a corresponding relation between a VLAN and the designated router into a local multicast snooping table at blocks 402 and 404 in FIG. 4. Generally speaking, the methods 500 and 600 may be construed as static configuration modes and the methods 700 and 800 may be construed as dynamic learning modes. According to an example, the processor 210 may implement the identifying module 230 in executing the methods depicted in FIGS. 5-8.

The static configuration mode may be applied in the following two application scenarios, which are respectively depicted with respect to FIGS. 5 and 6. In a first application scenario, and discussed with respect to FIG. 5, the edge device 112*a* in the MSN 100 may have a multicast snooping protocol, e.g., an IGMP snooping protocol, an MLD snooping protocol, a PIM Snooping protocol, etc., enabled. In addition, the MSN 100 may include a Layer 3 device having a first multicast protocol enabled and a Layer 3 device having a second multicast protocol enabled, in which the first multicast protocol may be the IGMP or the MLD protocol, and the second multicast protocol may be the PIM protocol. The PIM may be IPv4 PIM or IPv6 PIM.

At block 502, configuration information for a designated router port may be received. The configuration information may include designated router ports corresponding to each local VLAN, in which the designated router port corresponding to a VLAN is an Ethernet port connected to the multicast query device or the designated router in the VLAN. According to an example, the configuration information may be manually created by an administrator on each of the edge devices 112*a*-112*c* to configure the creation mode of a designated router port on the edge device 112*a* to be a static configuration mode. In this example, the administrator may configure the designated router ports corresponding to each VLAN on the edge device 112*a*. In addition, the designated router port corresponding to a VLAN may be an Ethernet port connected to a multicast query device or a designated router on the present device and in the VLAN.

At block 504, the corresponding relation between the VLAN and the designated router port may be inputted into the multicast snooping table according to the configuration information. Block 504 may be similar to block 404 discussed above with respect to the method 400 in FIG. 4.

In a second application scenario discussed with respect to FIG. 6, the edge device 112*a* in the MSN 100 may have the multicast snooping protocol, e.g., an IGMP snooping protocol, an MLD snooping protocol, a PIM snooping protocol, etc., enabled. In addition, the MSN 100 does not include a Layer 3 device having a multicast protocol, e.g., IGMP, MLD or PIM protocol, enabled. The PIM protocol may be IPv4 PIM or IPv6 PIM. In this application scenario, the edge device 112*a* may not be able to snoop and forward the multicast query message (e.g., an IGMP query message or a MLD query message) and the PIM Hello message (e.g., IPv4 PIM Hello message or IPv6 PIM Hello message). As such, all of the edge devices 112*a*-112*c* in the MSN 100 may not establish the multicast router ports. In addition, the multicast data of the multicast source may only be forwarded to the edge device 112*a* connected to the multicast source, while the multicast receiver connected to other edge devices 112*b*, 112*c* may not receive the multicast data. According to an example, a multicast snooping protocol and a multicast query function may be enabled on any of the edge devices 112*a*-112*c* in the MSN 100 to overcome this issue. The multicast snooping protocol and multicast query function may collectively be called a multicast snooping query function, e.g., an IGMP snooping query function.

At block 602, a multicast query function may be enabled to create a designated router port for each of the local VLANs, in which the designated router port corresponding to a VLAN is a virtual port in the VLAN. In one regard, because the multicast snooping protocol has been enabled on the edge device 112*a*, it may only be necessary to enable the multicast query function as well. After enabling the multicast query function, the edge device 112*a* may periodically send multicast query messages, e.g., IGMP query messages or MLD query messages. According to an example, the virtual port may be a null interface, etc., but not a MSN-link port.

At block 604, the corresponding relation between the VLAN and the designated router port may be inputted or configured into the local multicast snooping table.

Figure 7:
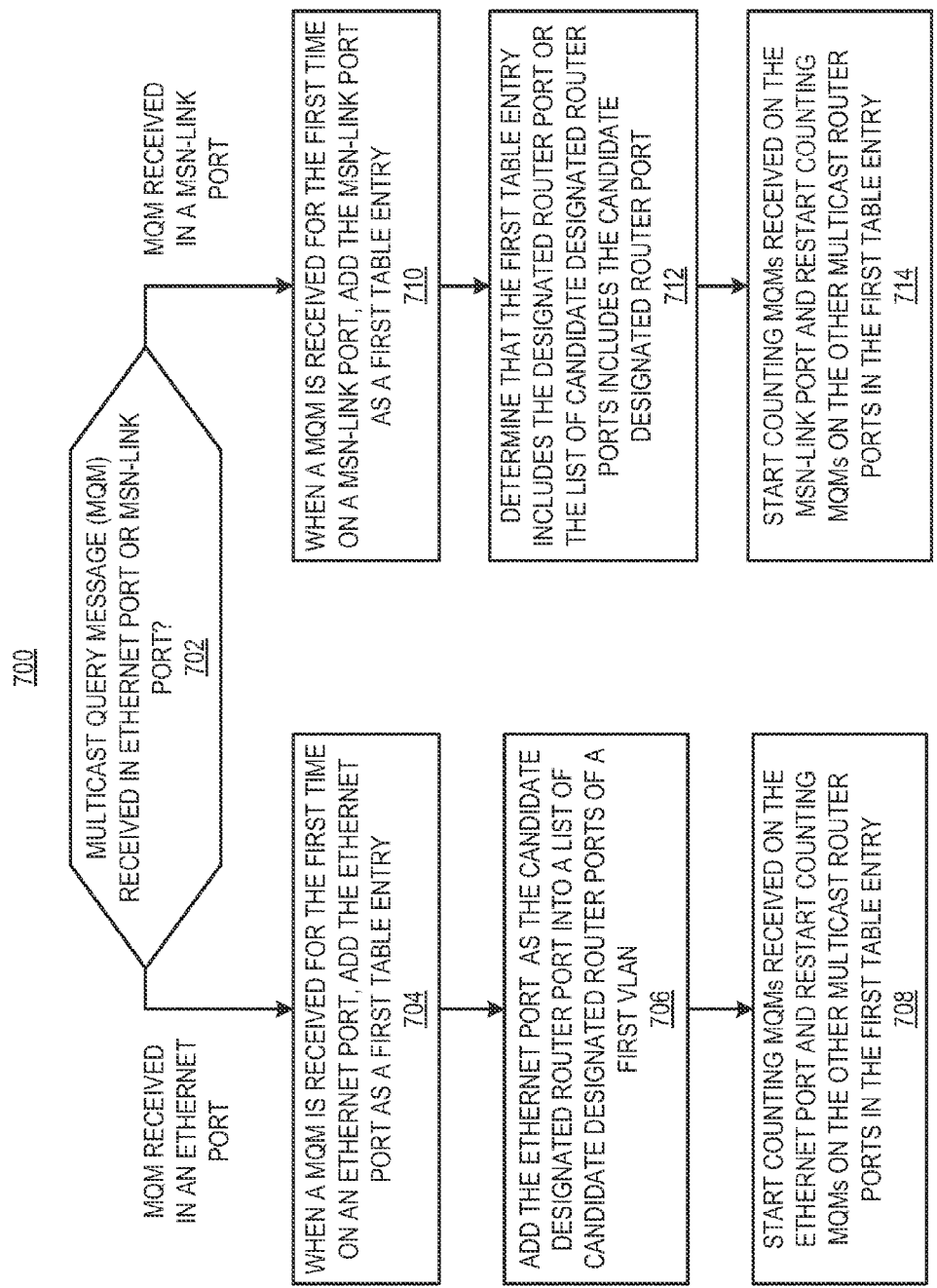

The dynamic learning mode may be applied in the following two application scenarios, which are respectively depicted with respect to FIGS. 7 and 8. In a first application scenario, the edge device 112*a* in the MSN 100 may have the multicast snooping protocol, e.g., an IGMP snooping protocol, an MLD snooping protocol, a PIM snooping protocol, etc., enabled. In addition, the MSN 100 may include a Layer 3 device having a first multicast protocol enabled and a Layer 3 device having a second multicast protocol enabled, in which, the first multicast protocol may be an IGMP or MLD protocol, and the second multicast protocol may be a PIM protocol. The may be IPv4 PIM or IPv6 PIM.

According to an example, the creation mode of the designated router port is to be a dynamic learning mode on each edge device 112*a*-112*c*. The edge device 112*a* may preferentially snoop the multicast query message, for example, the IGMP query message or the MLD query message. That is, if the edge device 112*a* is able to receive both the multicast query message and the PIM Hello message (e.g., IPv4 PIM Hello message or IPv6 PIM Hello message), the multicast query message may preferentially be snooped to dynamically learn the designated router port. In addition, learning at the multicast router port of the edge device 112a per se may not be influenced.

At block 702, a multicast query message (MQM) may be received in an Ethernet port or a MSN-link port. In response to the MQM being received in an Ethernet port, at block 704, when a MQM is received for the first time on the Ethernet port (which may be called a first Ethernet port herein), the first Ethernet port may be added as the multicast router port into a first table entry of the multicast snooping table. In addition, at block 706, the first Ethernet port may be added as the candidate designated router port into a list of candidate designated router ports of the first VLAN. Moreover, at block 708, counting of the received MQMs on the first Ethernet port may be started and counting of the received MQMs on other multicast router ports except for the first Ethernet port in the first table entry may be restarted.

In the method 700, the first Ethernet port may correspond to the first VLAN and the first table entry may be a table entry corresponding to the first VLAN. In addition, the list of candidate designated router ports may be used for recording information of the candidate designated router ports of the corresponding VLAN. Moreover, after adding the first Ethernet port as the multicast router port into a first table entry of the multicast snooping table, if the first table entry includes only one multicast router port, i.e., the first Ethernet port, it may be necessary to start counting of the received MQMs on the first Ethernet port only. Restarting counting of the received multicast query messages may refer to clearing the counting and re-starting the counting of the MQMs.

In response to the MQM being received in a MSN-link port, at block 710, when a MQM is received for the first time on a MSN-link port (which is called a first MSN-link port), the first MSN-link port may be added as the multicast router port into the first table entry. The first MSN-link port may correspond to the first VLAN. In addition, at block 712, a determination may be made that the first table entry includes the designated router port or that the list of candidate designated router ports includes the candidate designated router port. Moreover, at block 714, counting of the received MQMs on the first MSN-link port may be started and counting of the received MQMs on other multicast router ports except for the first MSN-link port in the first table entry may be re-started.

In blocks 702-714, after receiving the MQM from one port by the edge device 112a, while adding the port as a multicast router port into the corresponding table entry, a first tag may be added to the port to indicate that the port has become the multicast router port through snooping of the multicast query message. Even if the port may receive the MQM and PIM Hello message, only the first tag may be added, in which the first tag may specifically be an IGMP tag or an MLD tag. If the port becomes the multicast router port through snooping of the IGMP query message, an IGMP tag may be added. If the port becomes the multicast router port through snooping of the MLD query message, an MLD tag may be added.

When a multicast router port (which is called the first multicast router port) in the first table entry receives a first predetermined number of MQMs successively (e.g., learned through counting on the port), and other multicast router ports in the first table entry do not receive the MQM at this time (e.g., learned through counting on the corresponding ports), a determination may be made as to whether the first multicast router port is an Ethernet port and whether the first table entry has a designated router port, and with respect to different results of this determination, actions according to the following four cases may be taken. The relative order of the following cases should not be construed as denoting any significance of importance among the cases. In addition, the value of the first predetermined number may be pre-set as needed or desired. For example, the first predetermined number may be 3 or another number.

In a first case in which the result of the determination is that the first multicast router port is an Ethernet port and the first table entry does not include the designated router port, the first multicast router port may be configured into the first table entry as the designated router port. In addition, other candidate designated router ports except for the first multicast router port may be deleted from the list of the candidate designated router ports. Moreover, counting of the received MQMs on all of the multicast router ports may be stopped.

In a second case in which the result of the determination is that the first multicast router port is an Ethernet port and the first table entry includes a designated router port (e.g., Port1), when the first multicast router port is the designated router port (i.e., when the first multicast router port is Port1), other candidate designated router ports except for the first multicast router port may be deleted from the list of the candidate designated router ports. Moreover, counting of the received MQMs on all of the multicast router ports may be stopped. When the first multicast router port is not the designated router port (i.e., when the first multicast router port is not Port1), the designated router port in the first table entry may be replaced with the first multicast router port (i.e., Port1 is replaced with the first multicast router port). In addition, other candidate designated router ports except for the first multicast router port may be deleted from the list of the candidate designated router ports and counting of the received multicast query messages on all multicast router ports may be stopped.

In a third case in which the result of the determination is that the first multicast router port is a MSN-link port and the first table entry does not include the designated router port, the list of the candidate designated router ports may be cleared and counting of the received multicast query messages may be stopped on all of the multicast router ports.

In a fourth case in which the result of the determination is that the first multicast router port is a MSN-link port and the first table entry includes the designated router port, the designated router port may be deleted from the first table entry. In addition, the list of the candidate designated router ports may be cleared and counting of the received multicast query messages may be stopped on all of the multicast router ports.

The multicast router ports in the method 700 may become multicast router ports because the multicast router ports received multicast snooping messages. In addition, in blocks 702-714, when a multicast router port receives a MQM again, the counting on the port may be triggered to increment by 1 and the aging time of the multicast router port may be updated. If the multicast router port is also a designated router port, the aging time of the designated router port may also be updated, but execution of blocks 704-708 may not be triggered. When a multicast router port ages because it does not receive MQMs for a relatively long time, or when the multicast router port is manually deleted, the list of candidate designated router ports and the corresponding multicast snooping table entries need to be updated synchronously, i.e., if the multicast router port is a candidate designated router port, information of the port may be deleted from the list of candidate designated router ports. If the multicast router port is a designated router port, the designated router port of the corresponding multicast snooping table entry may be deleted.

Several cases that may occur during implementation of the method 700 will be described in detail below by taking the IGMP snooping protocol being enabled on the edge device 112a and the multicast snooping message being an IGMP query message as an example. It may be seen from the method 700 that in the first application scenario, the designated router port must be an Ethernet port instead of an MSN-link port. In addition, in this application scenario, there may be one or more candidate designated router ports in the list of candidate designated router ports.

In a first case in which the edge device 112a receives an IGMP query message from one Ethernet port (eth1), and adds eth1 as a multicast router port into the corresponding IGMP snooping table entries and adds an IGMP tag to eth1. In this case, eth1 may be added to the list of candidate designated router ports, and at this time, the IGMP snooping table entries only include one multicast router port, i.e., eth1. In addition, counting of the received IGMP query messages is started only on eth1. When the counting on eth1 indicates that eth1 has successively received three identical IGMP query messages, and the corresponding IGMP snooping table entries still do not have other multicast router ports that are triggered and generated by the IGMP query message added thereto, the edge device 112a may configure eth1 into the corresponding IGMP snooping table entries as the designated router port, namely, change eth1 into an active designated router port, as shown in table 6-1 below.

TABLE 6-1

| VLAN ID | DR-port | R-port | H-port |
|---|---|---|---|
| 100 | eth1(D) | eth1(IGMP) | G1: MSN-link21 |

In Table 6-1, D may represent that the designated router port is created using a dynamic learning mode.

In a second case in which the edge device 112a receives an IGMP query message from one Ethernet port eth1, the eth1 may be added as a multicast router port into the corresponding IGMP snooping table entries and an IGMP tag may be added to eth1. The eth1 may also be added to the list of candidate designated router ports, and at this time, the IGMP snooping table entries may only include one multicast router port, i.e., eth1. In addition, counting of the received IGMP query messages may be started only on eth1.

Before receiving three identical IGMP query messages successively on eth1 by the edge device 112a, IGMP query messages may be received through another Ethernet port (eth2). In this case, eth2 may also be added to the corresponding IGMP snooping table entries as a multicast router port. Since eth2 is an Ethernet port, eth2 may also be added to the list of candidate designated router ports. In addition, counting of the received IGMP query messages may be started on eth2, and counting of the received IGMP query messages on eth1 may be restarted. Moreover, when one port in the IGMP snooping table entries receives three identical IGMP query messages, a new Ethernet port may receive the IGMP query message, and the above-described process may be repeated again.

Subsequently, if one multicast router port (e.g., Ethernet port eth1) in the IGMP snooping table entries receives three identical IGMP query messages successively, and other multicast router ports eth2 and eth3 do not receive the IGMP query message, a determination as to whether eth1 is an Ethernet port or a MSN-link port may be continued. If eth1 is determined to be an Ethernet port, eth1 may be changed from a candidate designated router port into an active designated router port, i.e., eth1 may be added to the IGMP snooping table entries as a designated router port as shown in table 6-2. In addition, other candidate designated router ports except for eth1 in the list of candidate designated router ports may be deleted and counting of the received (or snooped) IGMP query messages on all multicast router ports may be stopped.

TABLE 6-2

| VLAN ID | DR-port | R-port | H-port |
|---|---|---|---|
| 100 | eth1(D) | eth1(IGMP), eth2(IGMP), eth3(IGMP) | G1: MSN-link21 |

Figure 9:
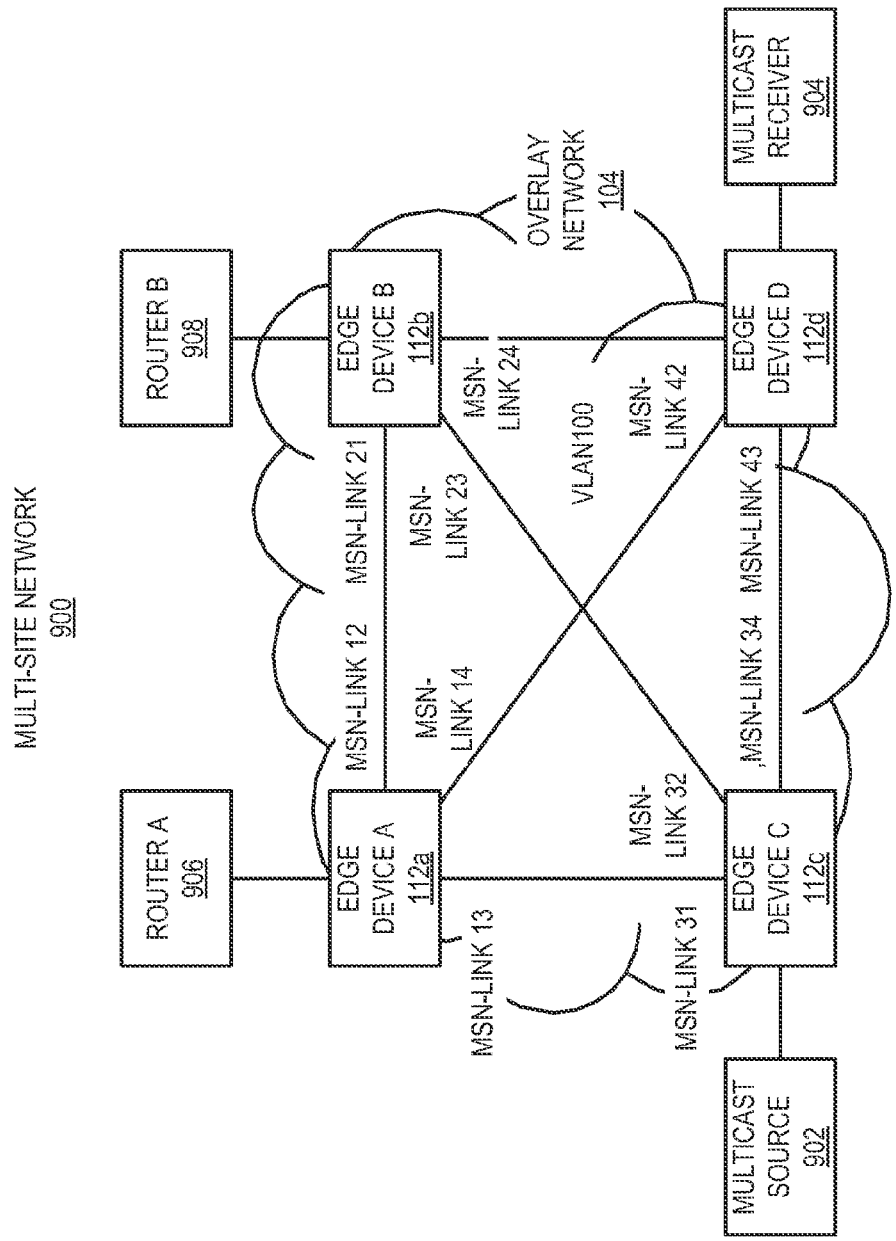
FIG. 9 is block diagram of a multi-site network in which a multicast source and a multicast receiver are connected to different edge devices, according to an example of the present disclosure.

In a third case in which the edge device 112a may receive an IGMP query message from one Ethernet port (eth1), eth1 may be added as a multicast router port into the corresponding IGMP snooping table entries and add an IGMP tag may be added to eth1. In addition, eth1 may be added to the list of candidate designated router ports, and at this time, the IGMP snooping table entries may include not only eth1, but also other multicast router ports, i.e., eth2 and MSN-link31 (FIG. 9). However, the IGMP snooping table entries may not include a designated router port. In this case, counting of the received IGMP query messages may be started on eth1, and at the same time, counting of the received IGMP query messages may be restarted on eth2 and MSN-link31. Next, if before one port in the IGMP snooping table entries receives three identical IGMP query messages, a new Ethernet port receives the IGMP query message, the above-described process may be repeated.

Subsequently, if one multicast router port MSN-link31 (which is a MSN-link port) in the IGMP snooping table entries receives three identical IGMP query messages successively, and the other multicast router ports eth1, eth2, eth3, and MSN-link22 do not receive the IGMP query message, the determination of whether the port receiving three identical IGMP query messages is an Ethernet port or an MSN-link port may be continued. Because MSN-link31 is an MSN-link port, the list of candidate designated router ports may be cleared and counting of the received IGMP query messages on all multicast router ports may be stopped.

In a fourth case in which the edge device 112a may receive an IGMP query message from one Ethernet port eth1, eth1 may be added as a multicast router port into the corresponding IGMP snooping table entries, and an IGMP tag may be added to eth1. In addition, eth1 may be added to the list of candidate designated router ports, and at this time, the IGMP snooping table entries may include not only eth1, but may also include other multicast router ports, i.e., eth2 and MSN-link31. The IGMP snooping table entries may also include a designated router port eth2. In addition, counting of the received IGMP query messages may be started on eth1, and at the same time, counting of the received IGMP query messages may be restarted on eth2 and MSN-link31. Next, if before one port in the IGMP snooping table entries receive three identical IGMP query messages, a new Ethernet port receives the IGMP query message, the above-described process may be repeated.

Subsequently, if one multicast router port eth2 (which is an Ethernet port) in the IGMP snooping table entries receives three identical IGMP query messages successively, and other multicast router ports MSN-link31, eth1, eth3 do not receive the IGMP query message, the determination as to whether the eth2 is a designated router port in the IGMP snooping table entries may be continued. Because eth2 is the current designated router port, the designated router port remains to be eth2 as shown in table 6-3, and other candidate designated router ports except for eth2 in the list of candidate designated router ports may be deleted. In addition, counting of the received IGMP query messages on all multicast router ports may be stopped.

TABLE 6-3

| VLAN ID | DR-port | R-port | H-port |
|---|---|---|---|
| 100 | eth2(D) | eth1(IGMP), eth2(IGMP), MSN-link31(IGMP), eth3(IGMP) | G1: MSN-link21 |

In a fifth case in which the edge device 112a may receive an IGMP query message from one Ethernet port (eth1), eth1 may be added as a multicast router port into the corresponding IGMP snooping table entries, and an IGMP tag may be added to eth1. In addition, eth1 may be added to the list of candidate designated router ports, and at this time, the IGMP snooping table entries may include not only eth1, but also other multicast router ports, i.e., eth2 and MSN-link31, and they may also include a designated router port eth2. In addition, counting of the received IGMP query messages may be started on eth1, and at the same time, counting of the received IGMP query messages may be restarted on eth2 and MSN-link31. Next, if before one port in the IGMP snooping table entries receives three identical IGMP query messages, a new Ethernet port receives the IGMP query message, the above-described process may be repeated.

Subsequently, if one multicast router port eth1 (which is an Ethernet port) in the IGMP snooping table entries receives three identical IGMP query messages successively, and other multicast router ports MSN-link31, eth2, eth3 do not receive the IGMP query message, the determination of whether the eth1 is a designated router port in the IGMP snooping table entries may be continued. In addition, because eth1 is not the current designated router port but a candidate designated router port, the designated router port in the IGMP snooping table entries may be changed from eth2 to eth1, and other candidate designated router ports except for eth1 in the list of candidate designated router ports may be deleted. Moreover, counting of the received IGMP query messages on all multicast router ports may be stopped.

Alternatively, if one multicast router port MSN-link31 (which is a MSN-link port) in the IGMP snooping table entries receives three identical IGMP query messages successively, and other multicast router ports eth1, eth2, and eth3 at this time do not receive an IGMP query message, the list of candidate designated router ports may be cleared. In addition, the designated router port eth2 may be deleted from the IGMP snooping table entries and counting of the received IGMP query messages on all multicast router ports may be stopped.

In a sixth case in which the edge device 112a receives the IGMP query message from an MSN-link port (MSN-link22), the edge device 112a may add MSN-link22 into the corresponding IGMP snooping table entries as a multicast router port, add an IGMP tag to indicate that the port becomes the multicast router port through snooping the IGMP query message, and a determination may be made as to whether the corresponding VLAN has the designated router port or candidate designated router port. If the list of candidate multicast routers of the corresponding VLAN does not include the candidate designated router port and the IGMP snooping table entries do not include the designated router port, no other processing may be performed.

In a seventh case in which the edge device 112a receives the IGMP query message from an MSN-link port (MSN-link22), the edge device 112a may add MSN-link22 into the corresponding IGMP snooping table entries as a multicast router port, and add an IGMP tag to indicate that the port becomes the multicast router port through snooping the IGMP query message. At this time, the multicast router ports in the IGMP snooping table entries may include: eth1, eth3, MSN-link31, MSN-link22. In addition, a determination may be made as to whether the IGMP snooping table entries include the designated router port or whether the list of candidate designated router ports include the candidate designated router ports. If yes, counting of the received IGMP query messages may be started on MSN-link22, and meanwhile, counting of the received IGMP query messages may be restarted on other multicast router ports.

Subsequently, if one multicast router port in the IGMP snooping table entries receives three identical IGMP query messages successively, and other multicast router ports do not receive the IGMP query message at the same time, then the determination as to whether the port receiving three identical IGMP query messages is an Ethernet port or an MSN-link port may be continued. If the port is an Ethernet port, the determination as to whether the port is a designated router port in the IGMP snooping table entries may be continued.

Specifically, for instance, in the event that the IGMP snooping table entries include the designated router port eth1, if the port receiving three identical IGMP query messages is the Ethernet port eth1, i.e., the designated router port, then eth1 may remain to be the designated router port as shown in table 6-4. In addition, other candidate designated router ports except for eth1 in the list of candidate designated router ports may be deleted and counting of the received IGMP query messages on all of the multicast router ports may be stopped. If the port receiving the three identical IGMP query messages is the Ethernet port eth3, i.e., a candidate designated router port, the designated router port in the IGMP snooping table entries may be changed from eth1 to eth3 as shown in table 6-5, and other candidate designated router ports except for eth3 in the list of candidate designated router ports may be deleted. In addition, counting of the received IGMP query messages on all of the multicast router ports may be stopped. If the port receiving the three identical IGMP query messages is the MSN-link port (MSN-link22), the designated router port eth1 in the IGMP snooping table entries may be deleted as shown in table 6-6. In addition, the list of candidate designated router ports may be cleared and counting of the received IGMP query messages on all of the multicast router ports may be stopped.

TABLE 6-4

| VLAN ID | DR-port | R-port | H-port |
|---|---|---|---|
| 100 | eth1(D) | eth1(IGMP), eth3(IGMP), MSN-link31(IGMP), MSN-link22(IGMP) | XXX |

TABLE 6-5

| VLAN ID | DR-port | R-port | H-port |
|---|---|---|---|
| 100 | eth3(D) | eth1(IGMP), eth3(IGMP), MSN-link31(IGMP) MSN-link22(IGMP) | G1: MSN-link21 |

TABLE 6-6

| VLAN ID | DR-port | R-port | H-port |
|---|---|---|---|
| 100 | | eth1(IGMP), eth3(IGMP), MSN-link31(IGMP), MSN-link22(IGMP) | G1: MSN-link21 |

In a second application scenario, the edge device 112a in the MSN 100 may enable the multicast snooping protocol, e.g., IGMP snooping, MLD snooping, and PIM snooping protocols, and the MSN may only include a Layer 3 device that has enabled the PIM protocol. In addition, the PIM may be IPv4 PIM or IPv6 PIM.

At this time, the creation mode of the designated router port may be configured to be a dynamic learning mode on each of the edge devices 112a-112c, and the MQM (e.g., IGMP query message or MLD query message) may be snooped in preference, but the MSN 100 at this time may only include the Layer 3 device that has enabled the PIM protocol. As such, the edge device 112a may only receive the PIM Hello (handshake) message, and the designated router port may be dynamically learned and elected through snooping contents of the PIM Hello message, while learning at the multicast router port of the edge device 112a itself may not be influenced.

Figure 8:
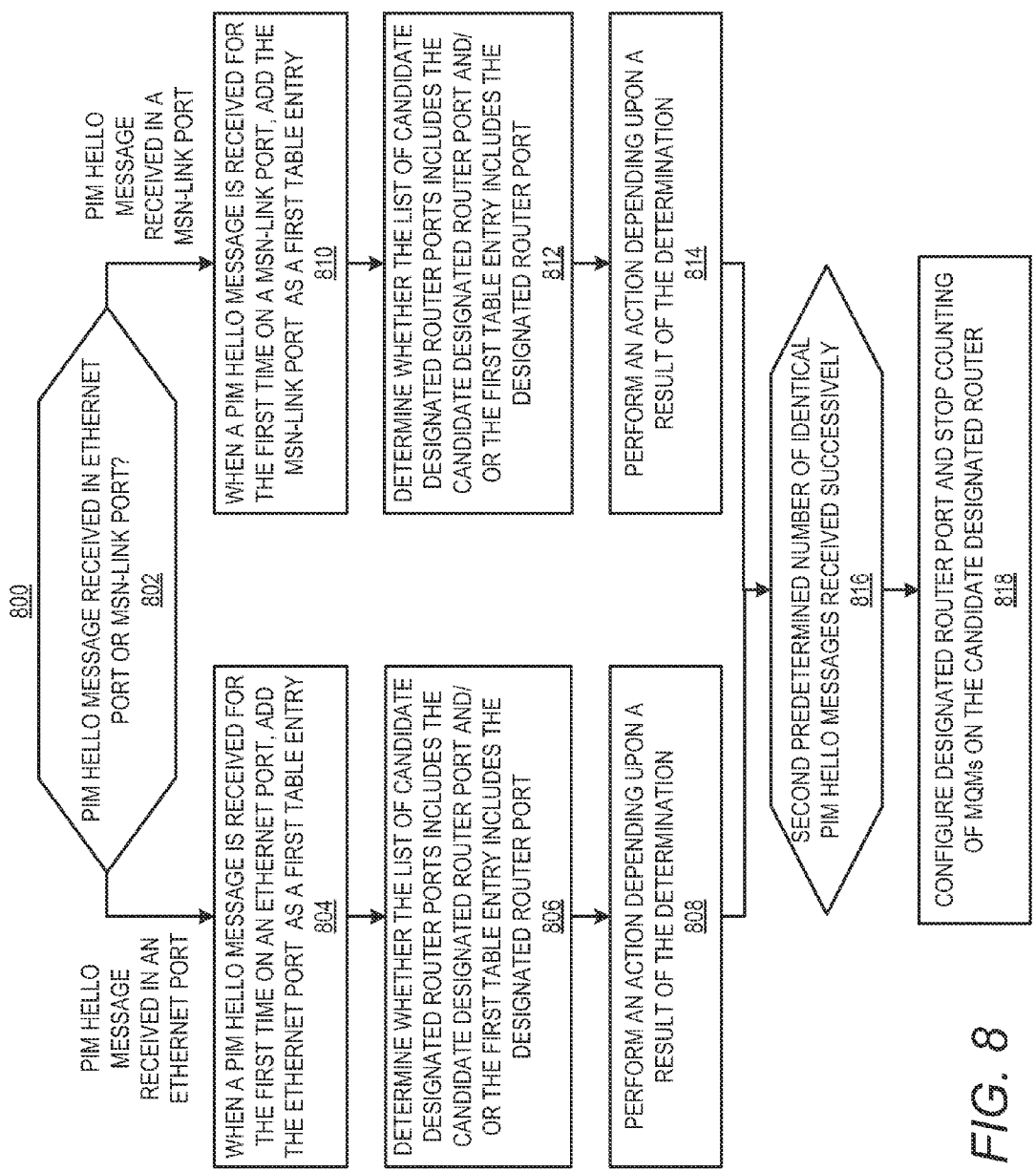

Turning now to FIG. 8, at block 802, a PIM Hello message may be received in an Ethernet port or a MSN-link port. In response to the PIM Hello message being received in an Ethernet port, at block 804, when a PIM Hello message is received for the first time on an Ethernet port (which may be called a first Ethernet port), the first Ethernet port may be added as the multicast router port into a first table entry of the multicast snooping table. The first table entry may be a table entry that corresponds to the first VLAN and the first VLAN may correspond to the first Ethernet port.

At block 806, a determination may be made as to whether the list of candidate designated router ports includes the candidate designated router port and/or whether the first table entry includes the designated router port. In addition, depending upon various results of the determination, different actions may be performed according to the following three cases.

In a first case in which the result of the determination is that the list of candidate designated router ports of the first VLAN does not include the candidate designated router port, relevant information of the first Ethernet port may be added into the list of candidate designated router ports. In addition, counting of the received PIM Hello messages on the first Ethernet port may be started, in which the relevant information may include: port identifier, priority parameter of the contesting DR, and source IP address carried in the PIM Hello message received at the port.

In a second case in which the result of the determination is that the list of candidate designated router ports includes a second port functioning as the candidate designated router port and the first table entry does not include the designated router port, the relevant information of the first Ethernet port may be compared with relevant information of the second port recorded in the list of candidate designated router ports. If the relevant information of the first Ethernet port is superior to the relevant information of the second port, the relevant information of the second port in the list of candidate designated router ports may be replaced with the relevant information of the first Ethernet port. In addition, counting of the received PIM Hello messages on the second port may be stopped and counting of the received PIM Hello messages on the first Ethernet port may be started.

In the second case, the relevant information of the first Ethernet port and the relevant information of the second port recorded in the list of candidate designated router ports may be compared as follows. In one example, the values of the contesting DR priority parameters in the relevant information of the first Ethernet port may be compared with the relevant information of the second port, and the one with a larger value may be identified as being superior. If the values of the contesting DR priority parameters are the same, the source IP addresses in the relevant information of the first Ethernet port and the second port may be compared, and the one with a larger IP address may be identified as being superior.

In a third case in which the result of the determination is that the first table entry includes a designated router port, the relevant information of the first Ethernet port and the relevant information of the designated router port recorded in the list of candidate designated router ports may be compared. If the relevant information of the first Ethernet port is superior to the relevant information of the designated router port, the designated router port may be deleted from the first table entry. In addition, the relevant information of the designated router port recorded in the information list of candidate designated router ports may be replaced with the relevant information of the first Ethernet port. Moreover, counting of the received PIM Hello messages on the first Ethernet port may be started.

In response to the PIM Hello message being received in a MSN-link port, at block 810, when a PIM Hello message is received for the first time on a MSN-link port (which may be called a first MSN-link port herein), the first MSN-link port may be added as a multicast router port into a first table entry, in which the first MSN-link port may correspond to the first VLAN.

At block 812, a determination may be made as to whether the list of candidate designated router ports includes the candidate designated router port and/or whether the first table entry includes the designated router port. In addition, depending upon various results of the determination, different actions may be performed according to the following three cases.

In a first case in which the result of the determination is that the list of candidate designated router ports does not include the candidate designated router port, relevant information of the first MSN-link port may be added into the information list of candidate designated router ports.

In a second case in which the result of the determination is that the information list of candidate designated router ports includes a third port functioning as the candidate designated router port, and the first table entry does not include the designated router port, relevant information of the first MSN-link port may be compared with relevant information of the third port. If the relevant information of the first MSN-link port is superior to the relevant information of the third port, the relevant information of the third port in the information list of candidate designated router ports may be replaced with relevant information of the first MSN-link port. In addition, counting of the received PIM Hello messages on the third port may be stopped.

In a third case in which the result of the determination is that the first table entry includes the designated router port, the relevant information of the first MSN-link port may be compared with the relevant information of designated router port recorded in the list of candidate designated router ports. If the relevant information of the first MSN-link port is superior to the relevant information of the designated router port, the designated router port may be deleted from the first table entry. In addition, relevant information of the designated router port recorded in the information list of candidate designated router ports may be replaced with relevant information of the first Ethernet port.

In blocks 810-814, after receiving the PIM Hello message from a port by the edge device 112a, while adding the port into the corresponding table entry as a multicast router port, a second tag may be added to the port to indicate that the port has become the multicast router port through snooping of the PIM Hello message. The second tag may be a PIM tag.

Following either of blocks 808 and 814, at block 816, a second predetermined number of identical PIM Hello messages may successively be received. The value of the second predetermined number may be pre-set as needed or desired, for example, the second predetermined number may be 3, etc. In addition, at block 818, the candidate designated router port may be configured as a designated router port into the first table entry and counting of the received multicast query messages on the candidate designated router port may be stopped.

The multicast router ports in blocks 802-814 may become multicast router ports because they received PIM Hello messages. In blocks 802-814, when a multicast router port receives a PIM Hello message again, counting on the port may be triggered to increment by 1 and the aging time of the multicast router port may be updated. If the multicast router port is a designated router port, the aging time of the designated router port may be updated, but execution of block 804 or 810 may not be triggered. When a multicast router port ages because the multicast router port does not receive PIM Hello messages for more than a predetermined length of time, or when the multicast router port is manually deleted, the list of candidate designated router ports and the corresponding multicast snooping table entries may need to be updated synchronously. That is, if the multicast router port is a candidate designated router port, relevant information of the port may be deleted from the list of candidate designated router ports. If the multicast router port is a designated router port, the designated router port of the corresponding multicast snooping table entry may be deleted and relevant information of the port may be deleted from the information list of the candidate designated router ports.

In addition, after learning, by the edge device 112a according to blocks 802-814, the active designated router port or candidate designated router port generated by snooping the PIM Hello message, if the Layer 3 device that enables a first multicast protocol, e.g. IGMP or MLD protocol, is subsequently deployed in the MSN 100, the edge device 112a may receive the multicast query message. In addition, the edge device 112a may delete the active designated router port or candidate designated router port generated by snooping the PIM Hello message. Moreover, processing according to blocks 702-714 may be performed.

It may be seen from blocks 802-814 that in this application scenario, the designated router port must be an Ethernet port instead of a MSN-link port. In addition, in this application scenario, there may be only one candidate designated router port in the list of candidate designate router ports. When a new candidate designated router port is generated, the relevant information of the original candidate designated router port may be replaced by relevant information of the new candidate designated router port.

Several cases that may occur during implementation of blocks 802-818 will be described in detail below. The relative order of the following cases should not be construed as denoting any significance or importance among the cases.

In a first case in which the edge device 112a receives only the PIM Hello message but not the IGMP query message from an Ethernet port (eth1), eth1 may be added to the corresponding IGMP snooping table entries as a multicast router port. In addition, a PIM tag may be added, which indicates that the port has become the multicast router port by snooping the PIM Hello message. At this time, the IGMP snooping table entries may only include one multicast router port, i.e., eth1, and the edge device 112a may add the relevant information of eth1 into the information list of the candidate designated router ports, in which the relevant information may include the ID of eth1, and a priority parameter of the contesting DR and source IP address carried in the PIM Hello message received at the corresponding port. In addition, counting of the received PIM Hello message may be started on eth1.

When the counting on eth1 indicates that three identical PIM Hello messages have been received successively on eth1 and the IGMP snooping table entries still include only one multicast router port, i.e., eth1, the edge device 112a may change eth1 from the candidate designated router port into an active designated router port. That is, eth1 may be added to the IGMP snooping table entries as a designated router port as shown in table 7-1, and counting of the received PIM Hello messages may be stopped on eth1.

TABLE 7-1

| VLAN ID | DR-port | R-port | H-port |
|---|---|---|---|
| 100 | eth1(D) | eth1(PIM) | G1: MSN-link22 |

In a second case in which the edge device 112a receives only the PIM Hello message but not the IGMP query message from an Ethernet port (eth1), eth1 may be added to the corresponding IGMP snooping table entries as a multicast router port. In addition, a PIM tag may be added, which indicates that the port becomes the multicast router port by snooping the PIM Hello message. At this time, the IGMP snooping table entries may only include one multicast router port, i.e., eth1, and the edge device 112a may add the relevant information of eth1 into the list of the candidate designated router ports. The relevant information may include the ID of eth1 and a priority parameter of the contesting DR and source IP address carried in the PIM Hello message received at eth1. In addition, counting of the received PIM Hello message may be started on eth1.

If the PIM Hello message is received from other ports (port 2, which may be an Ethernet port or a MSN-link port) before the edge device 112a has received three identical PIM Hello messages successively on eth1, the relevant information of eth1 may be compared to the relevant information of port2. If the relevant information of eth1 is superior to the relevant information of port2, this may be an indication that the PIM Hello message received on eth1 is superior to the PIM Hello message received on port2, and no other processing may be made. If the relevant information of port2 is superior to the relevant information of eth1, this may be an indication that the PIM Hello message received on port2 is superior to the PIM Hello message received on eth1. In addition, a determination as to whether port2 is an Ethernet port or a MSN-link port may be continued. If port2 is an Ethernet port, the relevant information of eth1 in the list of candidate designated router ports may be replaced with the relevant information of port2, counting of the received PIM Hello message may be stopped on eth1, and counting of the received PIM Hello message may be started on port2. If port2 is an MSN-link port, the relevant information of eth1 in the list of candidate designated router ports may be replaced with relevant information of port2, counting of the received PIM Hello message may be stopped on eth1, but port2 may only become the candidate designated router port and may not be changed into an active designated router port. In addition, before receiving three identical PIM Hello messages on one multicast router port in the IGMP-Snooping table entries, if the PIM Hello message is received on a new port, the above described process may be repeated.

According to an example in which the current candidate specified router port is eth1, when the counting on eth1 indicates that three identical PIM Hello messages have been received successively on eth1, and no other port receives more superior PIM Hello messages during this time period, eth1 may be changed into an active designated router port, i.e., eth1 may be added to the IGMP snooping table entries as a designated router port, as shown in table 7-2, and counting of the received PIM Hello messages may be stopped on eth1.

TABLE 7-2

| VLAN ID | DR-port | R-port | H-port |
|---|---|---|---|
| 100 | eth1(D) | eth1(PIM), port2(PIM) | G1: MSN-link22 |

In a third case in which the edge device 112a receives only the PIM Hello message but not the IGMP query message from an Ethernet port eth1, eth1 may be added to the corresponding IGMP snooping table entries as a multicast router port. In addition, a PIM tag may be added, in which the PIM tag indicates that the port becomes the multicast router port by snooping the PIM Hello message. At this time, the IGMP snooping table entries may include not only eth1, but also other multicast router ports, i.e., eth2 and MSN-link21, and a candidate designated router port MSN-link21. However, the IGMP snooping table entries may not include the active designated router port. In addition, the edge device 112a may compare the relevant information of eth1 to the relevant information of MSN-link21 recorded in the information list of the candidate designated router ports. If the relevant information of MSN-link21 is superior to the relevant information of eth1, no other processing may be made. If the relevant information of eth1 is superior to the relevant information of MSN-link21, the relevant information of MSN-link21 recorded in the information list of the candidate designated router ports may be replaced with the relevant information of eth1. Moreover, counting of the received PIM Hello messages on MSN-link21 may be stopped and counting of the received PIM Hello messages on eth1 may be started.

According to an example in which the current candidate designated router port is eth2, when the counting on eth2 indicates that eth2 has received three identical PIM Hello messages successively, no other port receives a more superior PIM Hello message during this time period. In addition, eth2 may be changed into an active designated router port, i.e., eth2 may be added to the IGMP snooping table entries as a designated router port as shown in table 7-3 and counting of the received PIM Hello messages may be stopped on eth2.

TABLE 7-3

| VLAN ID | DR-port | R-port | H-port |
|---|---|---|---|
| 100 | eth2(D) | eth1(PIM), eth2(PIM), MSN-link21(PIM) | G1: MSN-link22 |

In a fourth case in which the edge device 112a receives only the PIM Hello message but not the IGMP query message from an Ethernet port eth1, eth1 may be added to the corresponding IGMP snooping table entries as a multicast router port. In addition, a PIM tag may be added, in which the PIM tag may indicate that the port becomes the multicast router port by snooping the PIM Hello message. At this time, the IGMP snooping table entries may include not only eth1, but also other multicast router ports, i.e., eth2 and MSN-link21, and an active designated router port eth2. The edge device 112a may compare the relevant information of eth1 to the relevant information of eth2 recorded in the list of the candidate designated router ports. If the relevant information of eth2 is superior to the relevant information of eth1, no other processing may be made and eth2 may remain the designated router port. If the relevant information of eth1 is superior to the relevant information of eth2, the relevant information of eth2 recorded in the information list of the candidate designated router ports may be replaced with the relevant information of eth1. In addition, counting of the received PIM Hello messages on eth1 may be started.

According to an example in which the current candidate designated router port is eth1, when the counting on eth1 indicates that eth1 receives three identical PIM Hello messages successively, no other port receives a more superior PIM Hello message during this time period. In addition, eth1 may be changed into an active designated router port, i.e., eth1 may be added to the IGMP snooping table entries as a designated router port and counting of the received PIM Hello messages may be stopped on eth1.

In a fifth case in which, after receiving the PIM Hello message from an MSN-link port (MSN-link12) by the edge device 112a, MSN-link12 may be added to the corresponding IGMP snooping table entries as a multicast router port, and a PIM tag may be added, in which the PIM tag indicates that the port becomes a multicast router port through snooping the PIM Hello message. In addition, a determination may be made as to whether the list of the candidate designated router ports of the corresponding VLAN includes a candidate designated router port or whether the IGMP snooping table entries include an active designated router port. If no, the relevant information of the MSN-link12 may be added to the list of the candidate designate router ports, but MSN-link12 may only become the candidate designated router port and cannot be changed into an active designated router port.

In a sixth case in which, after receiving the PIM Hello message from an MSN-link port (MSN-link12) by the edge device 112a, MSN-link12 may be added to the corresponding IGMP snooping table entries as a multicast router port. In addition, a PIM tag may be added, in which the PIM tag indicates that the port becomes a multicast router port through snooping of the PIM Hello message. Moreover, a determination may be made as to whether the list of the candidate designated router ports of the corresponding VLAN includes a candidate designated router port or whether the IGMP snooping table entries include an active designated router port. If there is a candidate designated router port eth1 but no active designated router port, the relevant information of the MSN-link12 may be compared to the relevant information of eth1 recorded in the list of the candidate designate router ports. If the relevant information of eth1 is superior to the relevant information of MSN-link12, no other processing may be made. If the relevant information of MSN-link12 is superior to the relevant information of eth1, the relevant information of eth1 recorded in the list of the candidate designated router ports may be replaced by the relevant information of MSN-link12. In addition, counting of the received PIM Hello message may be stopped on eth1, but the MSN-link12 may only become the candidate designated router port and cannot be changed into an active designated router port.

In a seventh case in which, after receiving the PIM Hello message from an MSN-link port (MSN-link12) by the edge device 112a, MSN-link12 may be added to the corresponding IGMP snooping table entries as a multicast router port. In addition, a PIM tag may be added, in which the PIM tag may indicate that the port becomes a multicast router port through snooping of the PIM Hello message. If the IGMP snooping table entries include an active designated router port eth1 at this time, the relevant information of the MSN-link12 may be compared to the relevant information of eth1 recorded in the list of the candidate designate router ports. If the relevant information of eth1 is superior to the relevant information of MSN-link12, no other processing may be made. If the relevant information of MSN-link12 is superior to the relevant information of eth1, the designated router port eth1 may be deleted from the IGMP snooping table entries and the relevant information of eth1 recorded in the list of the candidate designate router ports may be replaced by the relevant information of MSN-link12, but the MSN-link12 may become the candidate designated router port and may not be changed into an active designated router port.

Turning now to FIG. 9, there is shown a block diagram of a MSN 900 in which a multicast source 902 and a multicast receiver 904 are connected to different edge devices 112a-112d, according to an example. In the MSN 900, with respect to the static configuration mode, the IGMP snooping protocol may be enabled on the edge devices 112a-112d, and the PIM and IGMP protocols may be enabled on routers 906, 908.

The creation mode of the designated router port may be a static configuration mode on a first edge device 112a and the designated router port corresponding to VLAN100 on the first edge device 112a may be an Ethernet port (eth1) that is connected to a first router 906, which serves as the designated router. In addition, after implementing blocks 502 and 504 in FIG. 5, the IGMP snooping table entries on the first edge device 112a may be as shown in table 8-1 and the IGMP snooping table entries on the other edge devices 112a-112d may be as shown in tables 4-2, 4-3 and 4-4.

TABLE 4-2

| VLAN ID | R-port | H-port |
|---|---|---|
| 100 | eth2, MSN-link21 | G1: MSN-link24 |

TABLE 4-3

| VLAN ID | R-port | H-port |
|---|---|---|
| 100 | MSN-link31, MSN-link32 | |

TABLE 4-4

| VLAN ID | R-port | H-port |
|---|---|---|
| 100 | MSN-link41, MSN-link42 | G1: eth4 |

TABLE 8-1

| VLAN ID | DR-port | R-port | H-port |
|---|---|---|---|
| 100 | eth1(S) | eth1, MSN-link12 | G1: MSN-link14 |

In table 8-1 above, S may represent that the designated router port is created using a static configuration mode.

When the multicast source 902 sends a multicast data message whose multicast group address is G1, the third edge device 112c may perform the replication according to multicast router ports MSN-link31 and MSN-link32 in the IGMP snooping table entries as shown in table 4-3 as well as the multicast member port of G1. Since the IGMP snooping table entries as shown in table 4-3 do not include the multicast member port of G1, the third edge device 112c may only replicate the multicast data message according to the multicast router ports MSN-link31 and MSN-link32, and perform tunnel-encapsulation to the replicated multicast data message according to MSN-link31 and MSN-link32 to obtain a MSN message, which may then be unicasted to the corresponding first edge device 112a and second edge device 112b.

After the first edge device 112a receives the MSN message from MSN-link13, the MSN message may be decapsulated to obtain a multicast data message. In addition, the IGMP snooping table entries as shown in table 8-1 may be found according to the VLAN information, i.e., VLAN100, carried in the MSN message. Moreover, the multicast data message may be replicated and forwarded according to the multicast router ports eth1 and MSN-link12 as well as the multicast member port MSN-link14 of G1 in the table entries. Since the table entries include the designated router port eth1, a replicated multicast data message may be encapsulated into a MSN message and forwarded according to MSN-link14. In addition, the MSN message having the multicast data message encapsulated therein may be sent to the fourth edge device 112d.

After the second edge device 112b receives the MSN message from MSN-link23, the MSN message may be decapsulated to obtain a multicast data message. The multicast data message may be replicated and forwarded according to the multicast router ports eth2 and MSN-link21 as well as the multicast member port MSN-link24 of G1 in the IGMP snooping table entries as shown in table 4-2. However, because of the horizontal partitioning function, the second edge device 112b may not encapsulate and forward the multicast data message according to MSN-link21 and MSN-link24. As such, the fourth edge device 112d may not receive the MSN message having the multicast data message encapsulated therein from the second edge device 112b.

After receiving, by the fourth edge device 112d, the MSN message having the multicast data message encapsulated therein from the first edge device 112a, the MSN message may be decapsulated to obtain the multicast data message and the multicast data message may be sent to the multicast receiver 904 through the multicast member port eth4 of G1 in the IGMP snooping table entries as shown in table 4-4.

In the MSN 900, in a first application scenario, the creation mode of the designated router ports is a dynamic learning mode on the edge devices 112a-112d, in which the edge devices 112a-112d all may enable the IGMP snooping protocol, and the routers 906, 908 may enable the IGMP and PIM protocols. The creation mode of the designated router port may be set to be a dynamic learning mode on the edge devices 112a-112d. In addition, the routers 906, 908 may elect the IGMP inquirer through the MSN 900 to finally elect R1 with a smaller IP address as the IGMP inquirer (i.e., IGMP inquiring device). Thus, on the first edge device 112a, Ethernet port eth1 may become the designated router port. The IGMP snooping table entries on the first edge device 112a may be as shown in table 8-2 and the IGMP snooping table entries on the edge devices 112b-112d may still be as shown in tables 4-2, 4-3 and 4-4.

TABLE 8-2

| VLAN | DR-port | R-port | H-port |
|---|---|---|---|
| 100 | eth1(D) | eth1(IGMP), MSN-link12(IGMP) | G1: MSN-linkl4 |

When the multicast source 902 sends a multicast data message whose multicast group address is G1, the third edge device 112c may perform the replication according to multicast router ports MSN-link31 and MSN-link32 in the IGMP snooping table entries as shown in table 4-3 as well as the multicast member port of G1. Since the IGMP snooping table entries as shown in table 4-3 do not include the multicast member port of G1, the third edge device 112c may only replicate the multicast data message according to the multicast router ports MSN-link31 and MSN-link32, and may perform tunnel-encapsulation to the replicated multicast data message according to MSN-link31 and MSN-link32 to obtain a MSN message. The MSN message may then be unicasted to the corresponding edge devices 112a, 112b.

After the first edge device 112a receives the MSN message from MSN-link13, the MSN message may be decapsulated to obtain a multicast data message. The IGMP snooping table entries as shown in table 8-2 may be found according to the VLAN information, i.e., VLAN100, carried in the MSN message. In addition, the multicast data message may be replicated and forwarded according to the multicast router ports eth1 and MSN-link12 as well as the multicast member port MSN-link14 of G1 in the table entries. Since the table entries include the designated router port eth1, a replicated multicast data message may be encapsulated into a MSN message and forwarded according to MSN-link14. Moreover, the MSN message having the multicast data message encapsulated therein may be sent to ED4.

After the second edge device 112b receives the MSN message from MSN-link23, the MSN message may be decapsulated to obtain a multicast data message. In addition, the multicast data message may be replicated and forwarded according to the multicast router ports eth2 and MSN-link21 as well as the multicast member port MSN-link24 of G1 in the IGMP snooping table entries as shown in table 4-2. However, due to the horizontal partitioning function, the second edge device 112b may not encapsulate and forward the multicast data message according to MSN-link21 and MSN-link24 and thus, the fourth edge device 112d may not receive the MSN message having the multicast data message encapsulated therein from the second edge device 112b.

After the fourth edge device 112d receives the MSN message having the multicast data message encapsulated therein from the first edge device 112a, the MSN message may be decapsulated to obtain the multicast data message and the multicast data message may be sent to the multicast receiver 904 through the multicast member port eth4 of G1 in the IGMP snooping table entries as shown in table 4-4.

In the MSN 900, in a second application scenario, the creation mode of the designated router ports may be a dynamic learning mode on the edge devices 112a-112d. In addition, the edge devices 112a-112d may all enable the IGMP snooping protocol and both of the routers 906, 908 may enable the PIM protocol. The routers 906 and 908 may exchange the PIM Hello message through the MSN 900 and may elect the second router 908, which in this example has a larger IP address than the first router 906, as the designated router. As such, the Ethernet port eth2 on the second edge device 112b will become the designated router port through snooping of the PIM Hello message. The IGMP snooping table entries on the second edge device 112b may be as shown in table 8-3 and the IGMP snooping table entries on the first edge device 112a, the third edge device 112c, and the fourth edge device 112d may still be as shown in tables 4-1, 4-3 and 4-4.

TABLE 8-3

| VLAN | DR-port | R-port | H-port |
|---|---|---|---|
| 100 | eth2(D) | eth2(PIM), MSN-link2l(PIM) | G1: MSN-link24 |

When the multicast source 902 sends a multicast data message whose multicast group address is G1, the third edge device 112c may perform the replication of the multicast data message according to multicast router ports MSN-link31 and MSN-link32 in the IGMP snooping table entries as shown in table 4-3 as well as the multicast member port of G1. Since the IGMP snooping table entries as shown in table 4-3 do not include the multicast member port of G1, the third edge device 112c may only replicate the multicast data message according to the multicast router ports MSN-link31 and MSN-link32, and may perform tunnel-encapsulation to the replicated multicast data message according to MSN-link31 and MSN-link32 to obtain a MSN message. The MSN message may then be unicasted to the corresponding first and second edge devices 112a, 112b.

After the first edge device 112a receives the MSN message from MSN-link13, the MSN message may be decapsulated to obtain a multicast data message. In addition, the multicast data message may be replicated and forwarded according to the multicast router ports eth1 and MSN-link12 as well as the multicast member port MSN-link14 of G1 in the IGMP snooping table entries as shown in table 4-1. However, due to the horizontal partitioning function, the first edge device 112a may not encapsulate and forward the multicast data message according to MSN-link12 and MSN-link14. As such, the fourth edge device 112d may not receive the MSN message having the multicast data message encapsulated therein from the first edge device 112a.

After the second edge device 112b receives the MSN message from MSN-link23, the MSN message may be decapsulated to obtain a multicast data message. The IGMP snooping table entries as shown in table 8-3 may be found according to the VLAN, i.e., VLAN100, corresponding to MSN-link23, and the multicast data message may be replicated and forwarded according to the multicast router ports eth2 and MSN-link21 as well as the multicast member port MSN-link24 of G1 in the table entries. Because the table entries include the designated router port eth2, the second edge device 112b may encapsulate a replicated multicast data message into a MSN message and forward the replicated multicast data message according to MSN-link24. In addition, the MSN message having the multicast data message encapsulated therein may be sent to the fourth edge device 112d.

After the fourth edge device 112d receives the MSN message having the multicast data message encapsulated therein from the second edge device 112b, the MSN message may be decapsulated to obtain the multicast data message. In addition, the multicast data message may be sent to the multicast receiver 904 through the multicast member port eth4 of G1 in the IGMP snooping table entries as shown in table 4-4.

According to an example in which the creation mode of a designated router port on the edge device 112a is a static configuration mode, the identifying module 230 depicted in FIG. 2 may include a receiving and configuring unit and the inputting module 232 may include a table entry configuring unit. The receiving and configuring unit may be for receiving configuration information for the designated router port, in which the configuration information may include a designated router port corresponding to each local VLAN, and the designated router port corresponding to one VLAN is an Ethernet port connected to a multicast query device or a designated router in the VLAN. The table entry configuring unit may be for configuring the corresponding relation between the VLAN and the designated router port into the multicast snooping table according to the configuration information received by the receiving and configuring unit.

According to another example in which the creation mode of a designated router port on the edge device 112a is a dynamic learning mode, and a multicast snooping protocol is enabled on the edge device 112a, and in which the MSN includes both a Layer 3 device on which a first multicast protocol is enabled and a Layer 3 device on which a second multicast protocol is enabled, the identifying module 230 may include an adding and determining unit, a first starting unit, a second starting unit, and a configuring unit. The adding and determining unit may, when a multicast query message is received for the first time on a first Ethernet port, add the first Ethernet port as the multicast router port into a first table entry of the multicast snooping table, add the first Ethernet port as the candidate designated router port into a list of candidate designated router ports of the first VLAN, in which the first Ethernet port may correspond to the first VLAN and the first table entry may be a table entry corresponding to the first VLAN. When a multicast query message is received for the first time on the first MSN-link port, the adding and determining unit may add the first MSN-link port as the multicast router port into the first table entry, determine whether the first table entry includes the designated router port or whether the list of candidate designated router ports includes the candidate designated router port, in which the first MSN-link port may correspond to the first VLAN.

The first starting unit may start counting of the received multicast query messages on the first Ethernet port, and at the same time, restart counting of the received multicast query messages on other multicast router ports except for the first Ethernet port. The second starting unit may, if the result of determination of the adding and determining unit is that the first table entry includes the designated router port or the list of candidate designated router ports includes the candidate designated router port, start counting of the received multicast query messages on the first MSN-link port. In addition, at the same time, the second starting unit may restart counting of the received multicast query messages on other multicast router ports except for the first MSN-link port in the first table entry.

The configuring unit may, when the first multicast router port in the first table entry receives a first predetermined number of multicast query messages successively, and other multicast router ports except for the first multicast router port in the first table entry do not receive the multicast query message at this time, determine whether the first multicast router port is an Ethernet port and whether the first table entry has a designated router port. If the first multicast router port is an Ethernet port and the first table entry does not include the designated router port, the first multicast router port may be configured into the first table entry as the designated router port. In addition, other candidate designated router ports, except for eth1, may be deleted from the list of the candidate designated router ports. Moreover, counting of the received multicast query messages on all multicast router ports may be stopped. If the first multicast router port is an Ethernet port, and the first table entry includes a designated router port, when the first multicast router port is the designated router port, other candidate designated router ports except for eth1 may be deleted from the list of the candidate designated router ports, and counting of the received multicast query messages on all of the multicast router ports may be stopped.

When the first multicast router port is not the designated router port, the designated router port in the first table entry may be replaced with the first multicast router port. In addition, other candidate designated router ports except for eth1 may be deleted from the list of the candidate designated router ports. Moreover, counting of the received multicast query messages on all of the multicast router ports may be stopped.

When a first predetermined number of multicast query messages is received successively on the first multicast router port in said first table entry first, if the first multicast router port is a MSN-link port and the first table entry does not include the designated router port, the list of the candidate designated router ports may be cleared. In addition, counting of the received multicast query messages on all of the multicast router ports may be stopped. If the first multicast router port is a MSN-link port and the first table entry includes the designated router port, the designated router port may be deleted from the first table entry, the list of the candidate designated router ports may be cleared, and counting of the received multicast query messages on all of the multicast router ports may be stopped.

Alternatively, when the creation mode of a designated router port on the edge device 112a is a dynamic learning mode and a multicast snooping protocol is enabled on the ED, and when the MSN only includes a Layer 3 device on which a second multicast protocol is enabled, the identifying module 230 may include a first adding and determining unit, a second adding and determining unit, a starting unit, a comparing unit, and a configuring unit. The first adding and determining unit may, when a PIM Hello message is received for the first time on a first Ethernet port, add the first Ethernet port as the multicast router port into a first table entry of the multicast snooping table, determine whether the information list of candidate designated router ports includes the candidate designated router port, and/or whether the first table entry includes the designated router port, in which the first table entry is a table entry corresponding to the first VLAN, and the first VLAN corresponds to the first Ethernet port.

The second adding and determining unit may, when a PIM Hello message is received for the first time from the MSN-link port, add the first MSN-link port as a multicast router port into the first table entry, determine whether the information list of candidate designated router ports includes the candidate designated router port, and/or whether the first table entry includes the designated router port. In addition, the first MSN-link port may correspond to the first VLAN. If the result of the determination is that the information list of candidate designated router ports of the first VLAN does not include the candidate designated router port, relevant information of the first MSN-link port may be added into the information list of candidate designated router ports. The relevant information may include a port identifier, a priority parameter of the contesting designated router and source IP address carried in the PIM Hello message received at the port, etc.

The starting unit may, if the result of the determination of the first adding and determining unit is that the information list of candidate designated router ports does not include the candidate designated router port, relevant information of the first Ethernet port may be added into the information list of candidate designated router ports and counting of the received PIM Hello messages on the first Ethernet port may be started.

The comparing unit may, if the result of determination of the first adding and determining unit is that the information list of candidate designated router ports includes a second port functioning as the candidate designated router port, and the first table entry does not include the designated router port, compare the relevant information of the first Ethernet port and relevant information of the second port recorded in the information list of candidate designated router ports. If the relevant information of the first Ethernet port is superior to the relevant information of the second port, replace the relevant information of the second port in the information list of candidate designated router ports with relevant information of the first Ethernet port. In addition, counting of the received PIM Hello messages on the second port may be stopped and counting of the received PIM Hello messages on the first Ethernet port may be started.

If the result of the determination of the first adding and determining unit is that the first table entry includes a designated router port, the relevant information of the first Ethernet port may be compared with the relevant information of the designated router port recorded in the information list of candidate designated router port. If the relevant information of the first Ethernet port is superior to the relevant information of the designated router port, the designated router port may be deleted from the first table entry. In addition, the relevant information of the designated router port recorded in the information list of candidate designated router ports may be replaced with the relevant information of the first Ethernet port and counting of the received PIM Hello messages on the first Ethernet port may be started.

If the result of the determination of the second adding and determining unit is that the information list of candidate designated router ports includes a third port functioning as the candidate designated router port, and the first table entry does not include the designated router port, the relevant information of the first MSN-link port may be compared with the relevant information of the third port. If the relevant information of the first MSN-link port is superior to the relevant information of the third port, relevant information of the third port in the information list of candidate designated router ports may be replaced with relevant information of the first MSN-link port. In addition, counting of the received PIM Hello messages on the third port may be stopped.

If the result of the determination of the second adding and determining unit is that the first table entry includes the designated router port, the relevant information of the first MSN-link port may be compared with the relevant information of the designated router port recorded in the list of candidate designated router ports. If the relevant information of the first MSN-link port is superior to the relevant information of the designated router port, the designated router port may be deleted from the first table entry. In addition, the relevant information of the designated router port recorded in the list of candidate designated router ports may be replaced with relevant information of the first Ethernet port.

The configuring unit may, if a candidate designated router port in the information list of candidate designated router ports receives a second predetermined number of identical PIM Hello messages successively, configure the candidate designated router port as a designated router port into the first table entry. In addition, counting of the received multicast query messages on the candidate designated router port may be stopped.

Alternatively, when the creation mode of a designated router port on the edge device 112a is a static learning mode, and a multicast snooping protocol is enabled on the edge device 112a, and when the MSN does not include a Layer 3 device on which a multicast protocol is enabled, the identifying module 230 may include an enabling unit, a creating unit, and a configuring unit. The enabling unit may enable a multicast query function.

The creating unit may create a designated router port for each VLAN of the device, in which the designated router port corresponding to one VLAN is a virtual port in the VLAN. The virtual port may not be an MSN-link port, but the virtual port may be, for example, a null interface. The configuring unit may configure the corresponding relation between the VLAN and the designated router port created by the creating unit into the multicast snooping table of the device.

Through implementation of either of the methods and apparatuses disclosed herein, in the case in which the multicast source 902 and the multicast receiver 904 are connected to different edge devices 112a-112d in a MSN 900, and the edge device 112a enables a multicast snooping protocol, a designated router port may be created for each VLAN on the edge device 112a. The designated router port may be one of the following ports in the corresponding VLAN: an Ethernet port connected to a multicast query device, an Ethernet port connected to the designated router, and a virtual port (which is not the MSN-link port). In addition, the corresponding relation between the VLAN and the designated router port may be configured into a local multicast snooping table. After receiving, by the edge device 112a, a MSN message that encapsulates the multicast data message from the MSN tunnel, the MSN message may be decapsulated to obtain the multicast data message. If the table entries of the corresponding VLAN include the designated router port and the multicast member port in the table entries that correspond to the group information in the multicast data message include the MSN-link port, the edge device 112a may be allowed to forward the multicast data message according to the MSN-link port. As such, receipt by the multicast receiver 904 of the multicast data of the multicast source 902 may be ensured.

In addition, in order to prevent the multicast data message in the MSN network from being wrongly replicated, it may be ensured that one VLAN has a corresponding designated router port only on one edge device. In addition, the designated router port may be created in two modes, i.e., a static configuration mode and a dynamic learning mode. In each mode, corresponding creation methods may be provided for different MSN network application scenarios.

Some or all of the operations set forth in the methods 300-800 may be contained as utilities, programs, or subprograms, in any desired computer accessible medium. In addition, the methods 300-800 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 10:
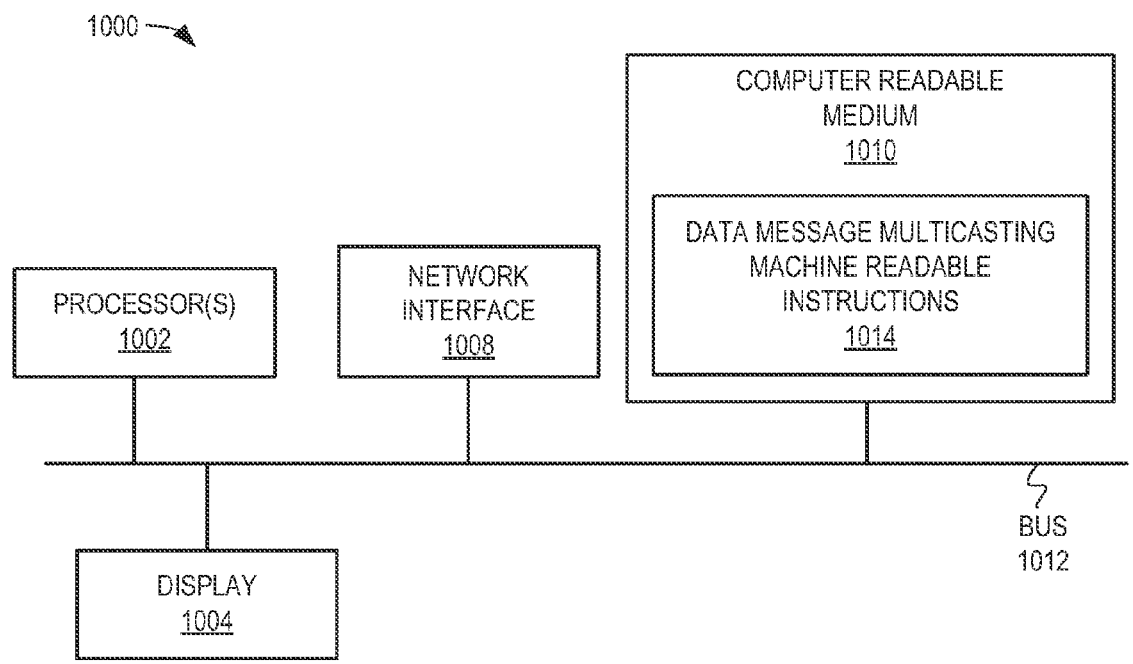
FIG. 10 shows a schematic representation of a computing device, which may be employed to perform various functions of the edge device depicted in FIG. 2, according to an example of the present disclosure.

Turning now to FIG. 10, there is shown a schematic representation of a computing device 1000, which may be employed to perform various functions of the edge device 112a depicted in FIG. 2, according to an example. The device 1000 may include a processor 1002, a display 1004, such as a monitor; a network interface 1008, such as a Local Area Network LAN, a wireless 802.11x LAN, a 3G mobile WAN or a WiMax WAN; and a computer-readable medium 1010. Each of these components may be operatively coupled to a bus 1012. For example, the bus 1012 may be an EISA, a PCI, a USB, a FireWire, a NuBus, or a PDS.

The computer readable medium 1010 may be any suitable medium that participates in providing instructions to the processor 1002 for execution. For example, the computer readable medium 1010 may be non-volatile media, such as an optical or a magnetic disk; volatile media, such as memory. The computer-readable medium 1010 may also store data message multicasting machine readable instructions 1014, which may perform some or all of the methods 300-800 and may include the modules 220-234 of the data message multicasting apparatus 202 depicted in FIG. 2. In this regard, the data message multicasting machine readable instructions 1014 may include a data message receiving module 220, a decapsulating module 222, a multicast determining module (or searching module) 224, a replicating module 226, an encapsulating module 228, an identifying module (or creating module) 230, an inputting module (or configuring module) 232, and a sending module 234.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for multicasting a data message by an apparatus over a multi-site network (MSN), said method comprising:

receiving, in the apparatus, a multicast data message that is to be communicated to another apparatus over the MSN and that includes group information of a multicast group to which the multicast data message belongs and virtual local area network (VLAN) information, the apparatus including a MSN-link port through which data messages are to be communicated to the another apparatus and a designated router port corresponding to a VLAN, a relation between the VLAN and the designated router port included in a local multicast snooping table;

determining, by a processor, that the received multicast data message is to be communicated to the another apparatus through the MSN-link port, by identifying a table entry in the local multicast snooping table that matches the VLAN information, the table entry including: a multicast router port corresponding to the designated router port, and a multicast member port corresponding to the group information and to the MSN-link port;

replicating, by the processor, the received multicast data message according to the multicast router port and the multicast member port;

encapsulating, by the processor, the replicated multicast data message into a MSN message; and tunneling, by the processor, the MSN message to the another apparatus over the MSN-link port.

2. The method according to claim 1, further comprising:

receiving configuration information that identifies the designated router port corresponding to the VLAN, wherein the designated router port is an Ethernet port connected to a multicast query device or a designated router in the VLAN; and wherein inputting the corresponding relation between the VLAN and the designated router port further comprises inputting the corresponding relation according to the received configuration information.

3. The method according to claim 1, further comprising:

receiving an initial multicast query message on a first Ethernet port of the apparatus;

adding the first Ethernet port as a first multicast router port into a first table entry of the multicast snooping table;

adding the first Ethernet port as a candidate designated router port in a list of candidate designated router ports of the VLAN;

counting a number of multicast query messages received on the first Ethernet port;

counting a number of multicast query messages received on multicast router ports in the multicast snooping table other than the first Ethernet port;

determining that the first multicast router port in the first table entry receives a first predetermined number of multicast query messages successively over a time period and the other multicast router ports other than the first multicast router port do not receive a multicast query messages over the time period;

determining whether the first multicast router port is an Ethernet port and whether the first table entry has a designated router port;

in response to a determination that the first multicast router port is an Ethernet port and the first table entry does not include the designated router port,
   inputting the first multicast router port into the first table entry as the designated router port;
   deleting candidate designated router ports except for the first multicast router port from the list of candidate designated router ports; and
   ending the counting of the received multicast query messages on all of the multicast router ports.

4. The method according to claim 3, further comprising:
in response to a determination that the first multicast router port is an Ethernet port and the first table entry includes a designated router port,
   in response to a determination that the first multicast router port is the designated router port, deleting the candidate designated router ports other than the first multicast router port from the list of candidate designated router ports; and
   in response to a determination that the first multicast router port is not the designated router port, replacing the designated router port in the first table entry with the first multicast router port, and deleting the candidate designated router ports other than the first multicast router port from the list of candidate designated router ports.

5. The method according to claim 3, further comprising:
in response to a determination that the first multicast router port is a MSN-link port and the first table entry does not include the designated router port, clearing the list of the candidate designated router ports and stopping counting of the received multicast query messages on all of the multicast router ports; and
in response to a determination that the first multicast router port is a MSN-link port and the first table entry includes the designated router port,
   deleting the designated router port from the first table entry;
   clearing the list of the candidate designated router ports; and
   stopping counting of the received multicast query messages on all of the multicast router ports.

6. The method according to claim 1, further comprising:
receiving an initial multicast query message on a first MSN-link port of the apparatus;
adding the first MSN-link port as the multicast router port into the first table entry;
determining whether the first table entry includes the designated router port or whether the list of candidate designated router ports includes the candidate designated router port, wherein the first MSN-link port corresponds to the first VLAN; and
in response to the first table entry including the designated router port or the list of candidate designated router ports includes the candidate designated router port, starting counting of the received multicast query messages on the first MSN-link port and restarting counting of the received multicast query messages on other multicast router ports except for the first MSN-link port in the first table entry.

7. The method according to claim 1, further comprising:
receiving a protocol independent multicast (PIM) handshake Hello message for the first time on a first Ethernet port;
adding the first Ethernet port as the multicast router port into a first table entry of the multicast snooping table;
determining whether the information list of candidate designated router ports includes the candidate designated router port, and/or whether the first table entry includes the designated router port, wherein the first table entry is a table entry corresponding to the first VLAN, and the first VLAN corresponds to the first Ethernet port;
in response to the list of candidate designated router ports of the first VLAN not including the candidate designated router port, adding relevant information of the first Ethernet port into the list of candidate designated router ports, and starting counting of the received PIM Hello messages on the first Ethernet port;
in response to the list of candidate designated router ports including a second port functioning as the candidate designated router port, and the first table entry does not include the designated router port, comparing the relevant information of the first Ethernet port and relevant information of the second port recorded in the list of candidate designated router ports;
   in response to the relevant information of the first Ethernet port being superior to the relevant information of the second port, replacing the relevant information of the second port in the list of candidate designated router ports with relevant information of the first Ethernet port, stopping counting of the received PIM Hello messages on the second port, and starting counting of the received PIM Hello messages on the first Ethernet port;
   in response to a candidate designated router port in the list of candidate designated router ports receiving a second predetermined number of identical PIM Hello messages successively, configuring the candidate designated router port as a designated router port into the first table entry, and stopping counting of the received multicast query messages on the candidate designated router port.

8. The method according to claim 7, further comprising:
in response to the first table entry including a designated router port, comparing the relevant information of the first Ethernet port and the relevant information of the designated router port recorded in the list of candidate designated router ports;
   in response to the relevant information of the first Ethernet port being superior to the relevant information of the designated router port, deleting the designated router port from the first table entry, and replacing the relevant information of the designated router port recorded in the list of candidate designated router ports with the relevant information of the first Ethernet port, and starting counting of the received PIM Hello messages on the first Ethernet port.

9. The method according to claim 7, further comprising:
in response to a PIM Hello message being received for the first time from the first MSN-link port, adding the first MSN-link port as a multicast router port into the first table entry;
determining whether the information list of candidate designated router ports includes the candidate designated router port, and/or whether the first table entry includes the designated router port, wherein the first MSN-link port corresponds to the first VLAN;
in response to the list of candidate designated router ports not including the candidate designated router port, adding relevant information of the first MSN-link port into the list of candidate designated router ports;

in response to the list of candidate designated router ports including a third port functioning as the candidate designated router port, and the first table entry not including the designated router port, comparing the relevant information of the first MSN-link port and relevant information of the third port;

in response to the relevant information of the first MSN-link port being superior to the relevant information of the third port, replacing the relevant information of the third port in the information list of candidate designated router ports with relevant information of the first MSN-link port and stopping counting of the received PIM Hello messages on the third port;

in response to the first table entry including the designated router port, comparing the relevant information of the first MSN-link port and relevant information of the designated router port recorded in the information list of candidate designated router ports; and in response to the relevant information of the first MSN-link port being superior to the relevant information of the designated router port, deleting the designated router port from the first table entry, replacing the relevant information of the designated router port recorded in the information list of candidate designated router ports with relevant information of the first Ethernet port.

10. The method according to claim 1, wherein the MSN does not include a Layer 3 device that enables a multicast protocol, and wherein the method further comprises:

enabling a multicast query function and creating a designated router port for each local VLAN, wherein the designated router port corresponding to one VLAN is a virtual port in the VLAN; and configuring the corresponding relation between the VLAN and the designated router port into the local multicast snooping table.

11. An apparatus for multicasting a data message in a multi-site network (MSN), said apparatus comprising:

a processor; and a memory on which is store machine readable instructions that when executed by the processor cause the processor to:

identify a designated router port in the apparatus corresponding to a virtual local area network (VLAN); and input a corresponding relation between the VLAN and the designated router port into a local multicast snooping table;

receive a multicast data message that is to be communicated to another apparatus over the MSN and that includes VLAN information and group information of a multicast group to which the multicast data message relates, wherein the apparatus includes a MSN-link port through which data messages are to be communicated to the another apparatus;

determine, from a table entry in the local multicast snooping table, that the received multicast data message is to be communicated to the another apparatus through the MSN-link port, by identifying a table entry in the local multicast snooping table that matches the VLAN information, the table entry including: a multicast router port corresponding to the designated router port, and a multicast member port corresponding to the group information and to the MSN-link port;

replicate the received multicast data message according to the multicast router porter and the multicast member port;

encapsulate the replicated multicast data message into a MSN message; and tunnel the MSN message to the another apparatus over the MSN-link port.

12. A non-transitory computer readable storage medium on which is stored machine readable instructions that when executed by a processor of an apparatus for multicasting a data message in a multi-site network (MSN) cause the processor to:

identify a designated router port in the apparatus corresponding to a virtual local area network (VLAN); and input a corresponding relation between the VLAN and the designated router port into a local multicast snooping table;

receive a multicast data message that is to be communicated to another apparatus over the MSN and that includes VLAN information and group information of a multicast group to which the multicast data message relates, the apparatus including a MSN-link port through which data messages are to be communicated to the another apparatus;

determine, from a table entry in the local multicast snooping table, that the received multicast data message is to be communicated to the another apparatus through the MSN-link port, by identifying a table entry in the local multicast snooping table that matches the VLAN information, the table entry including: a multicast router port corresponding to the designated router port, and a multicast member port corresponding to the group information and to the MSN-link port;

replicate the received multicast data message according to the multicast router porter and the multicast member port;

encapsulate the replicated multicast data message into a MSN message; and tunnel the MSN message to the another apparatus over the MSN-link port.

* * * * *